Dec. 19, 1933.  H. J. CARTER  1,940,581
AUTOMATIC MACHINE FOR MAKING BOTTLE CAPS
Filed July 18, 1932  23 Sheets-Sheet 1
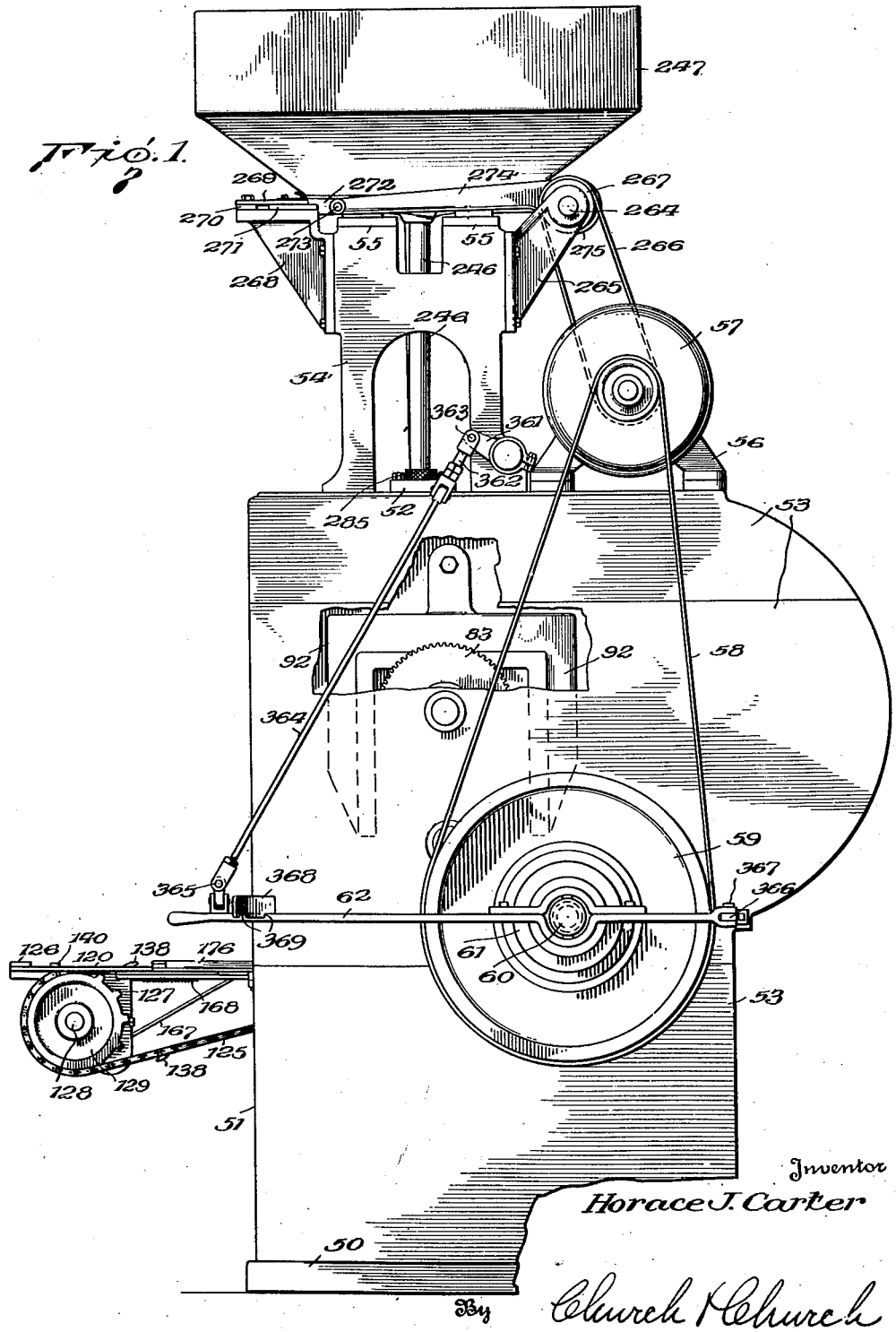

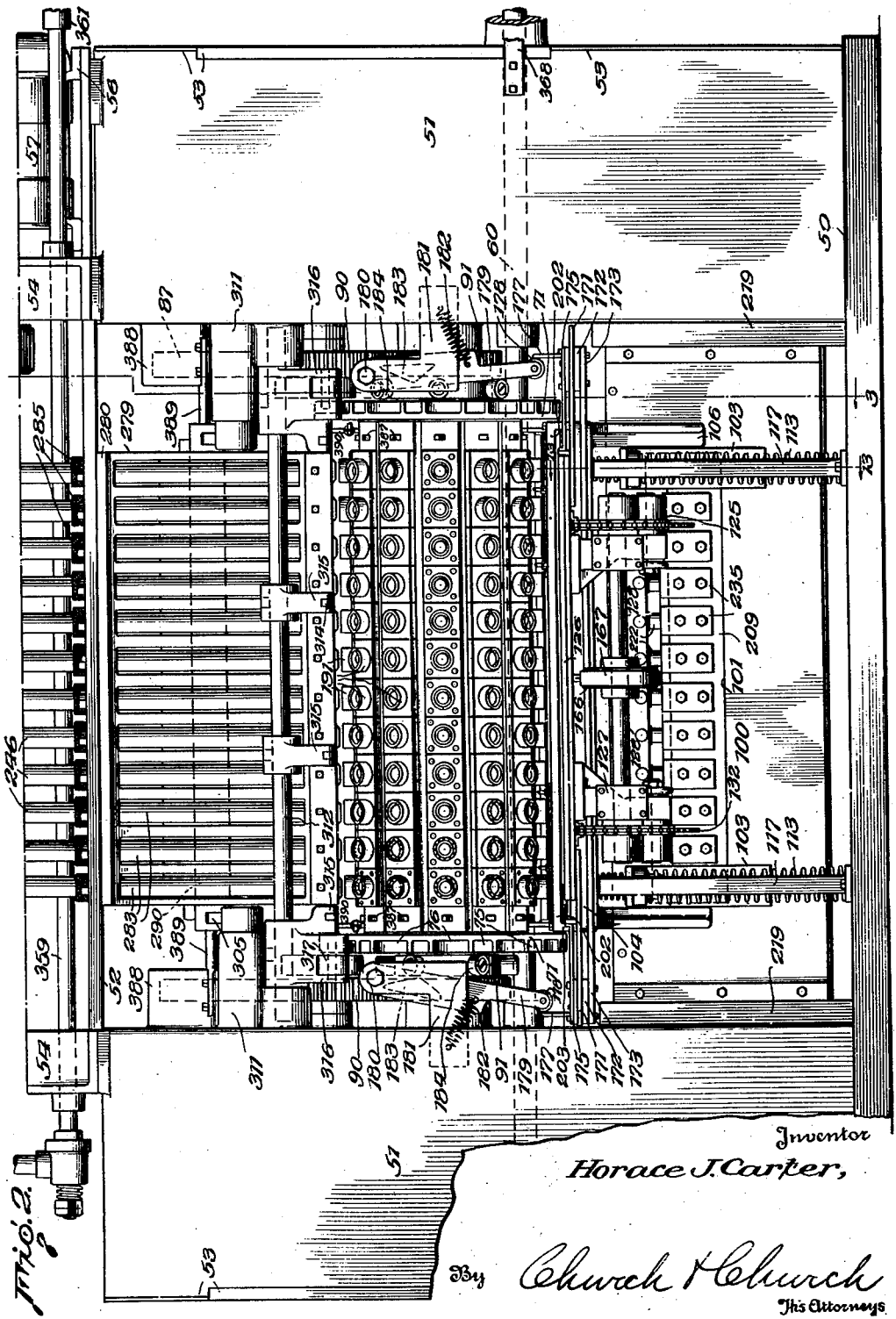

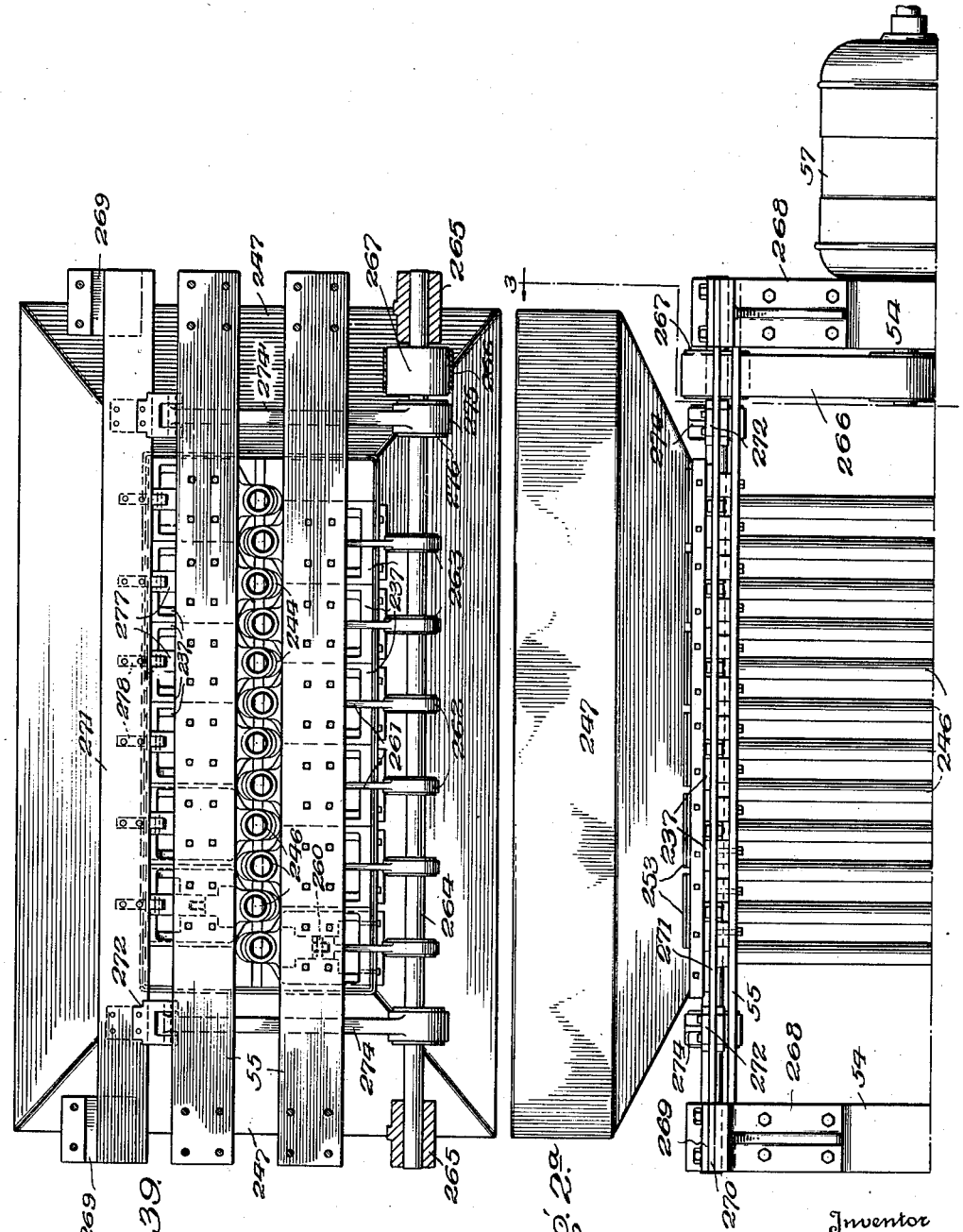

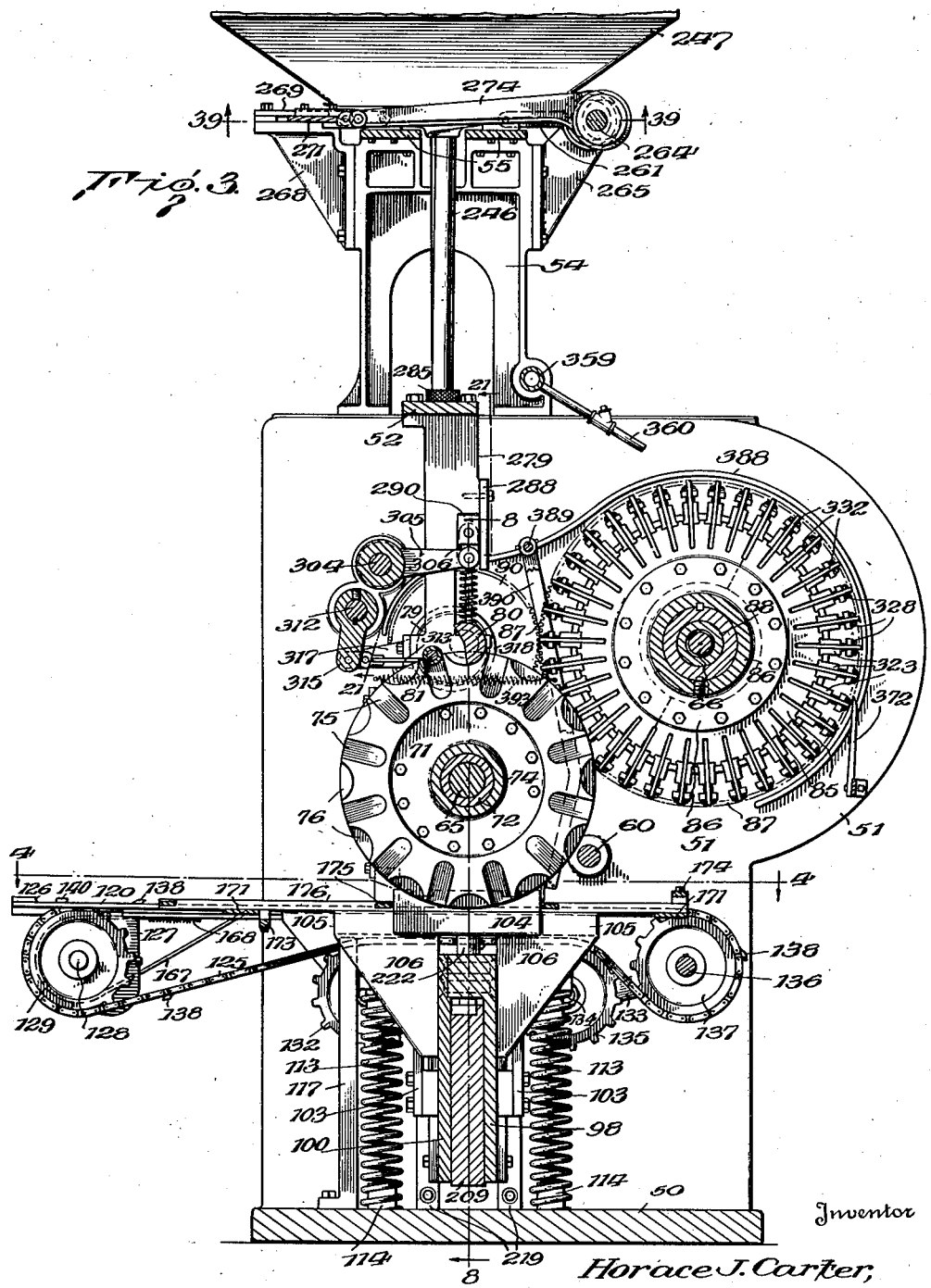

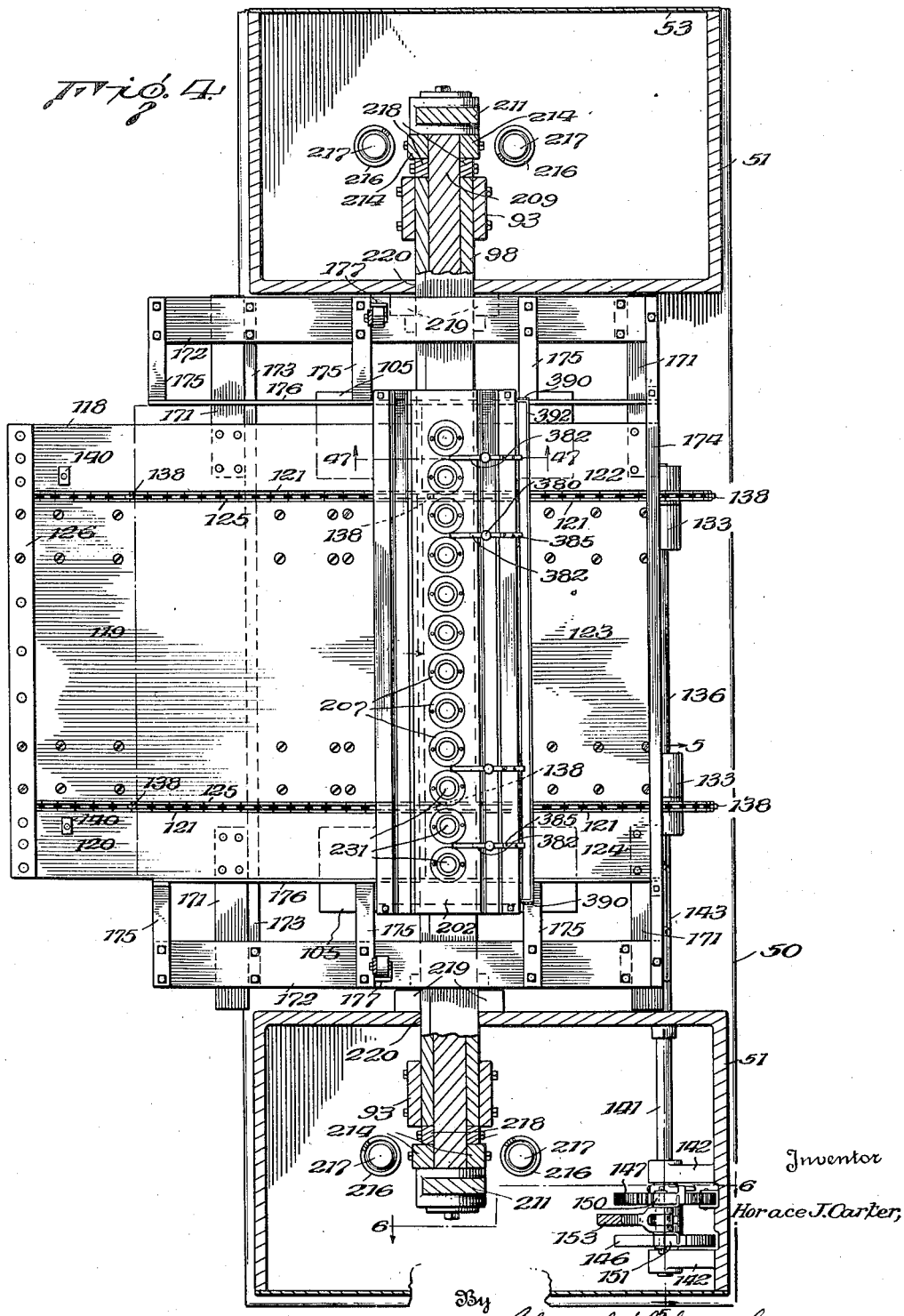

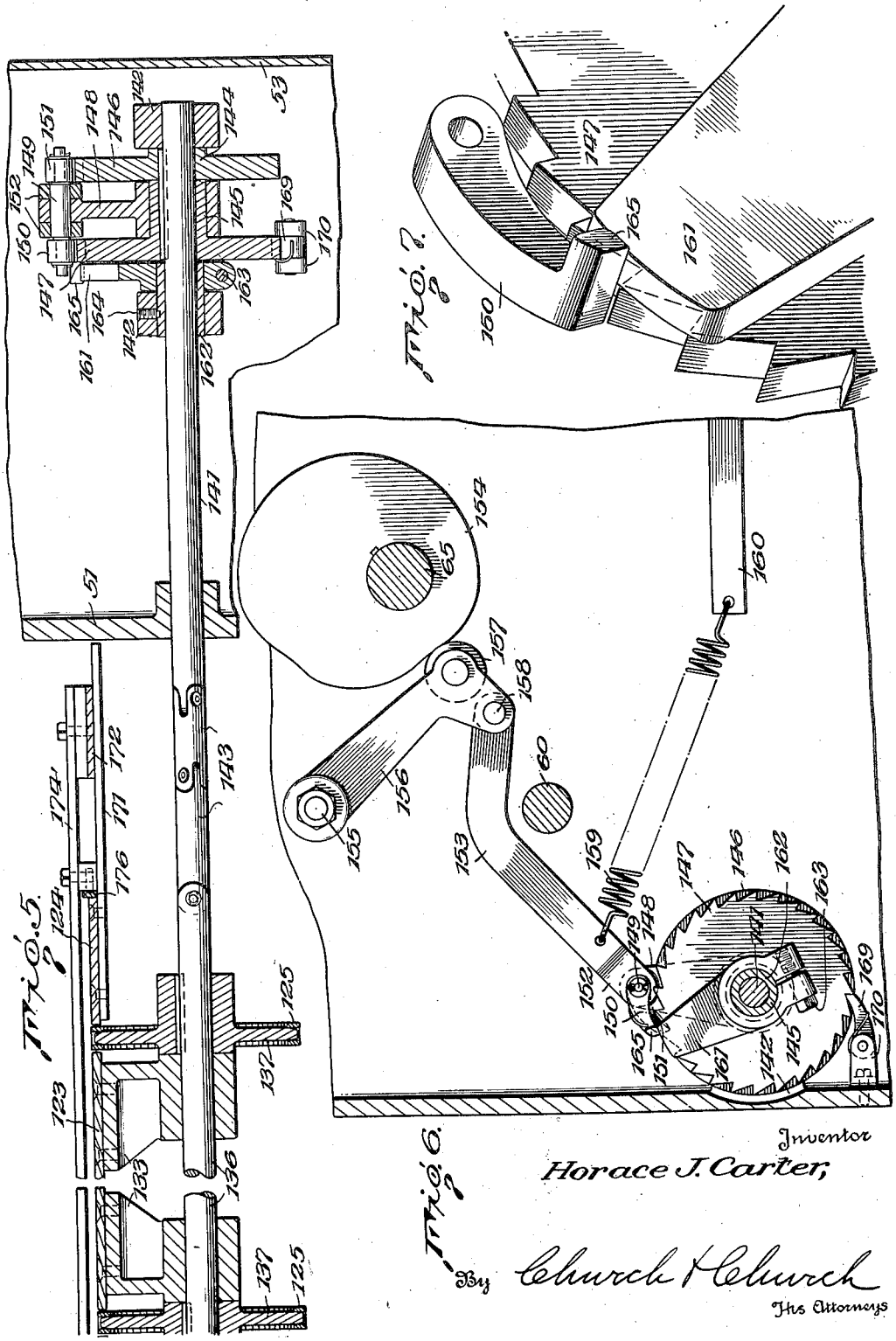

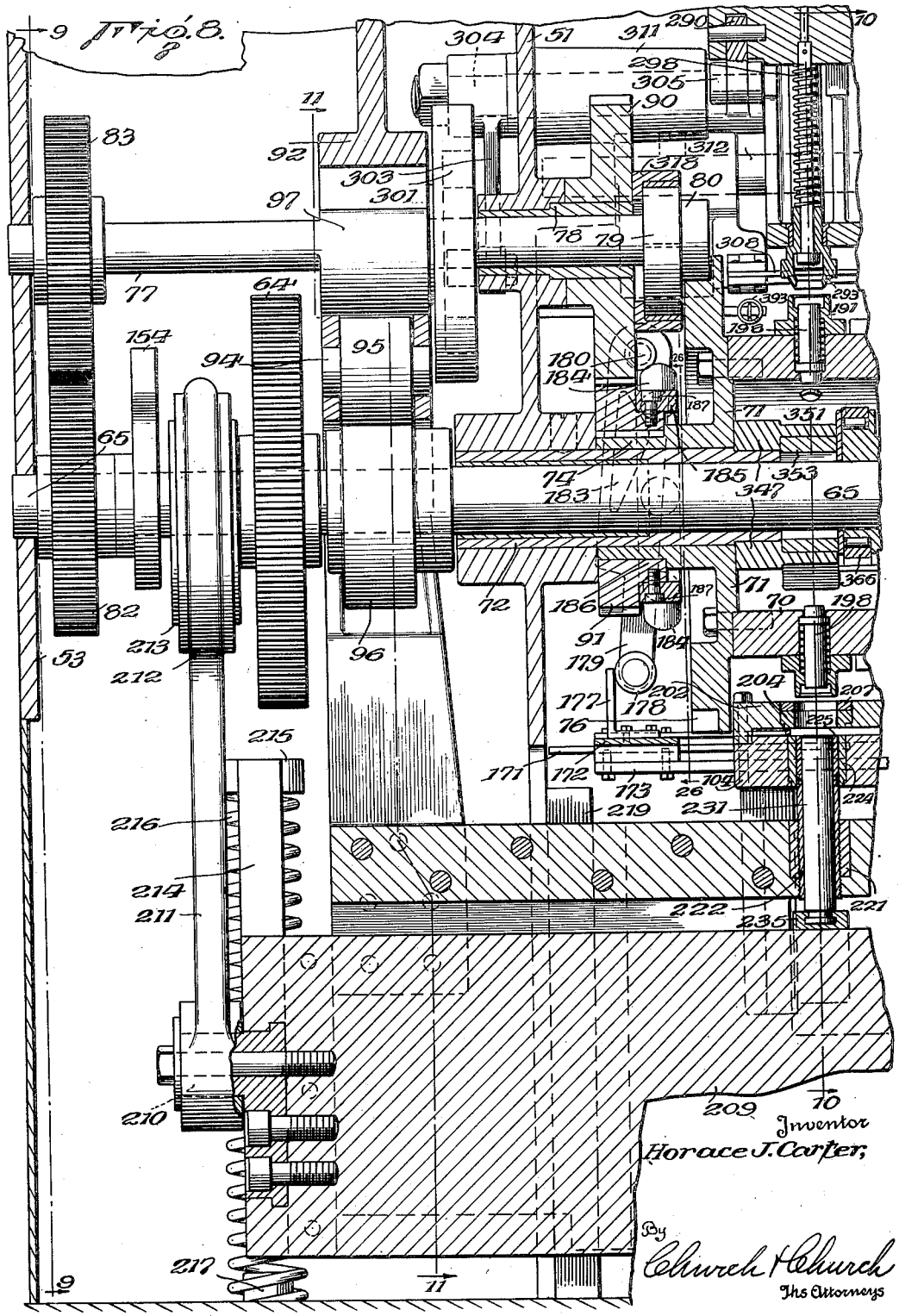

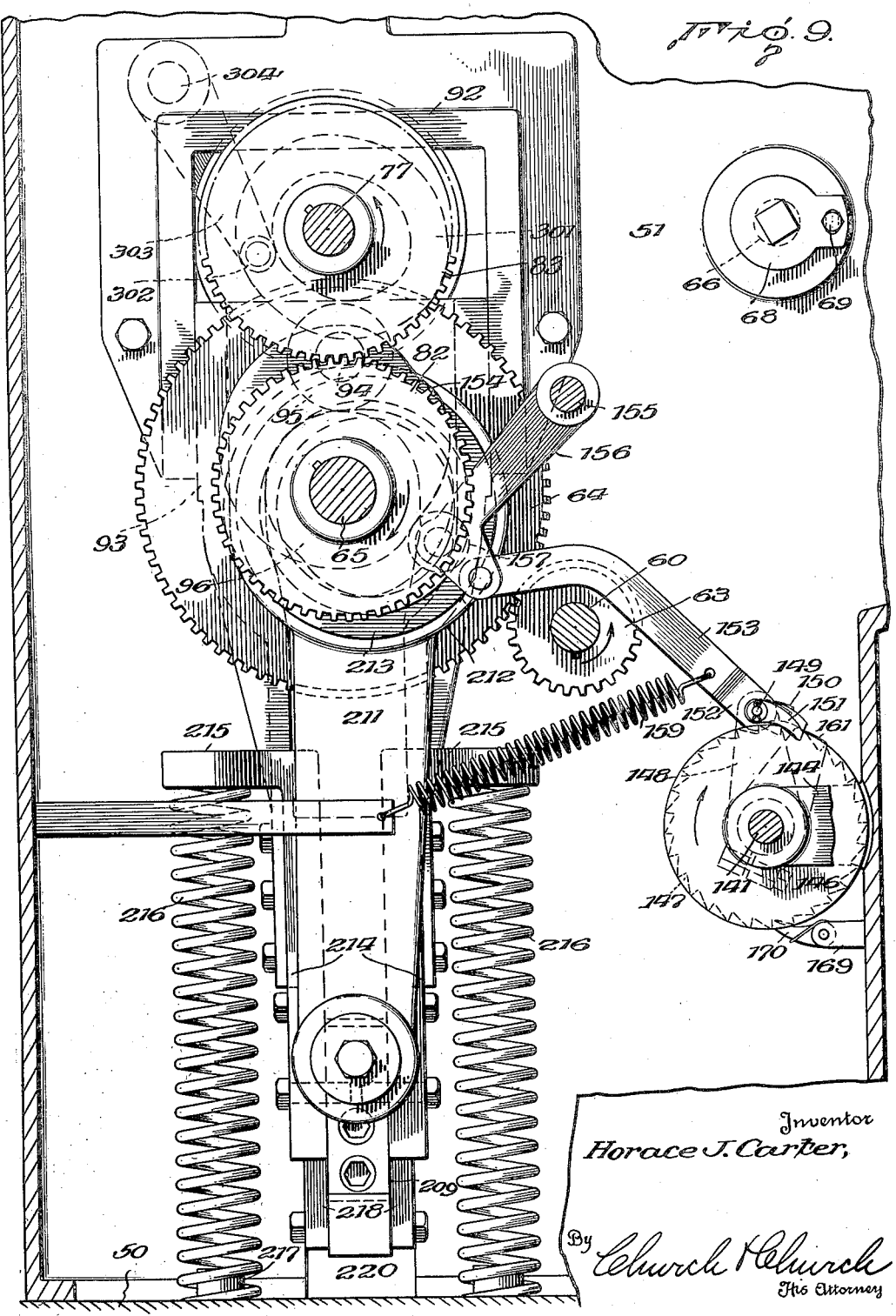

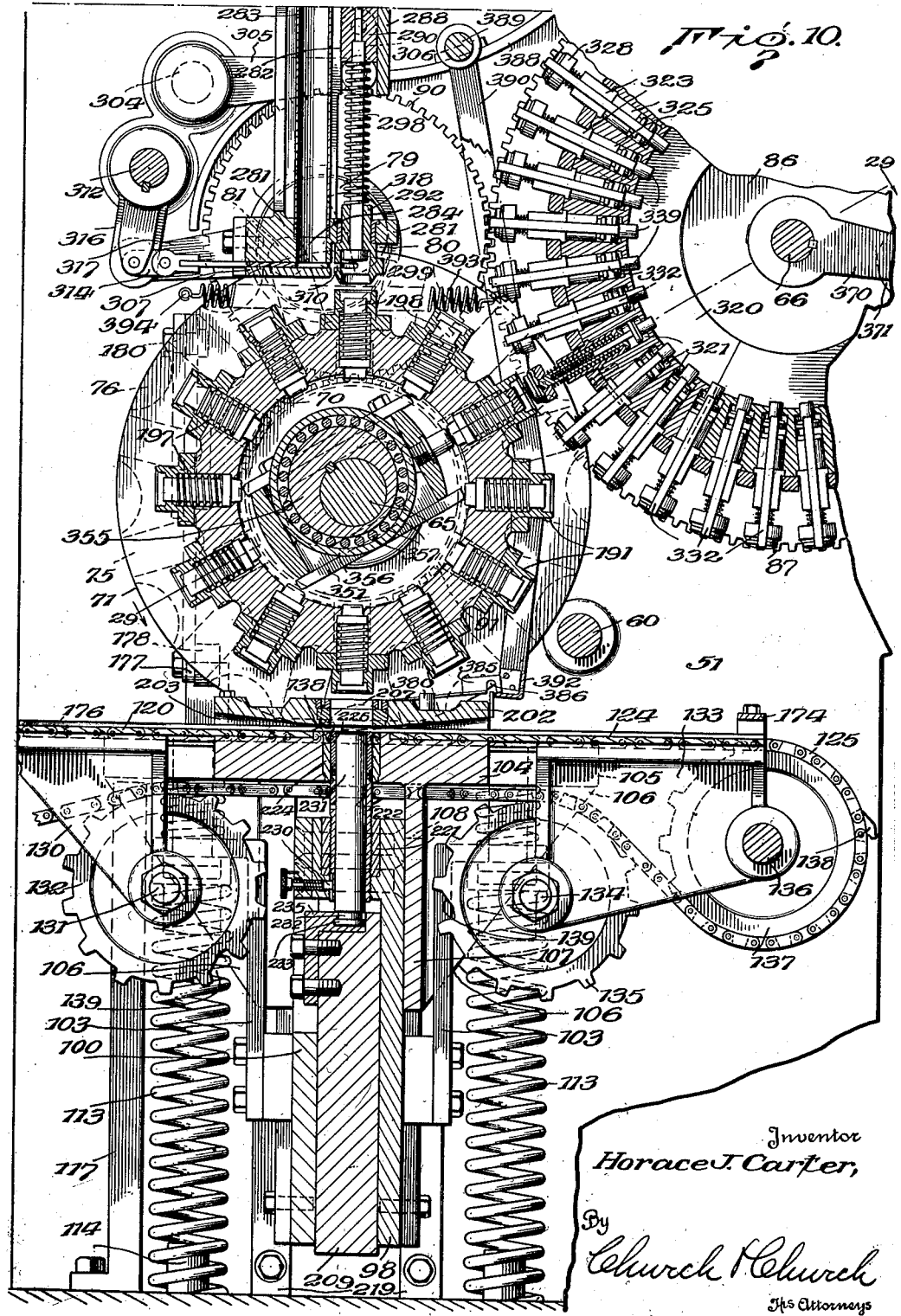

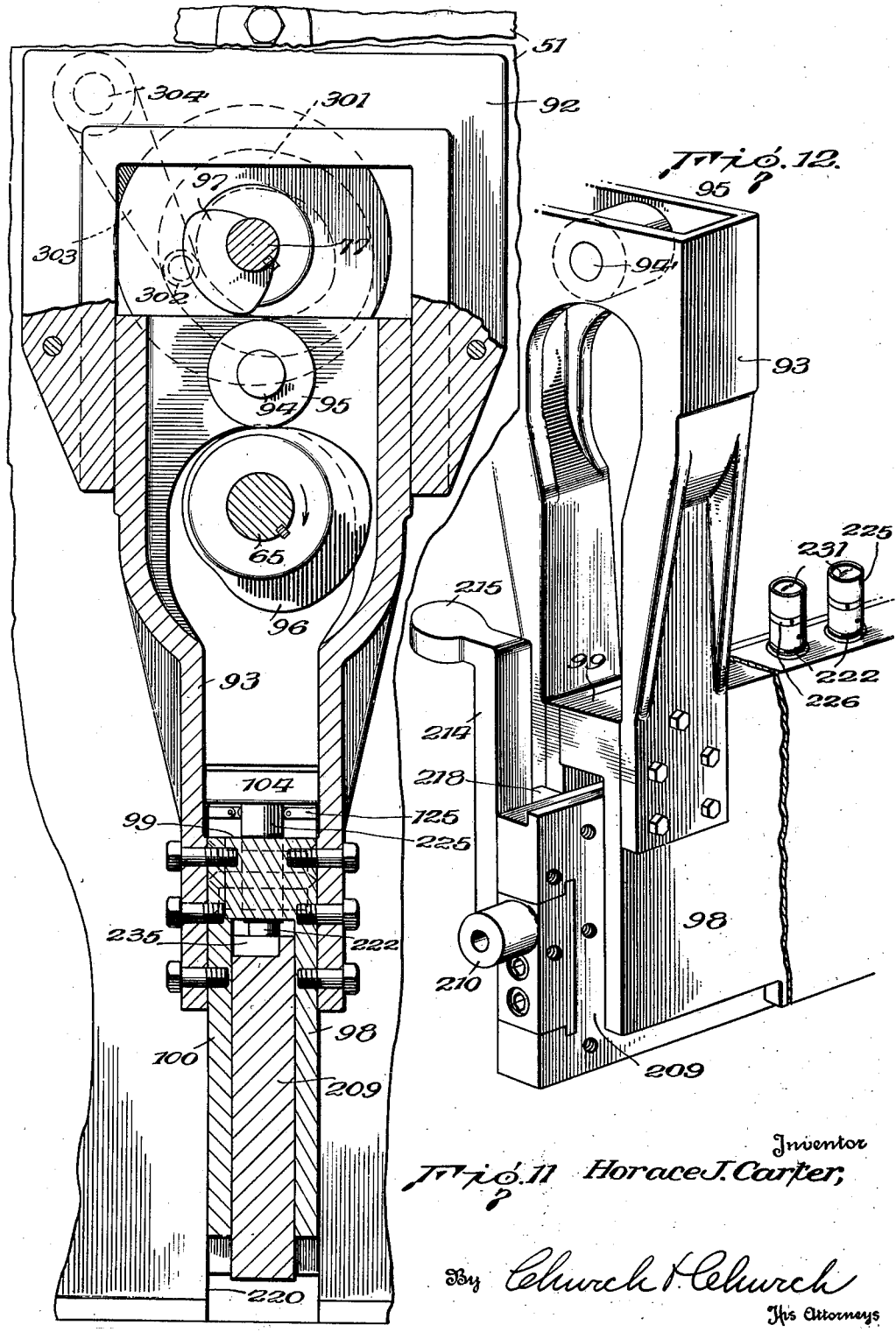

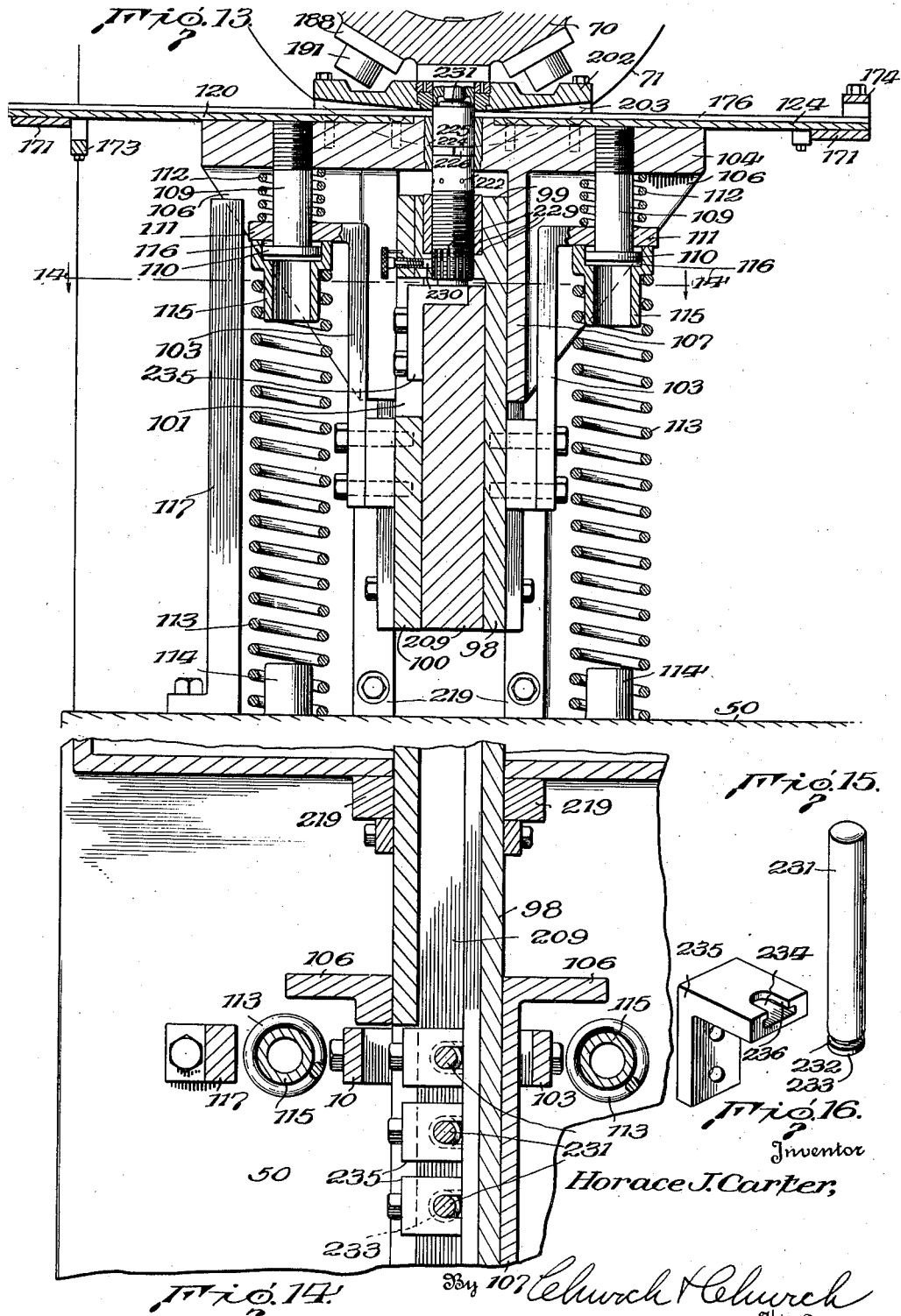

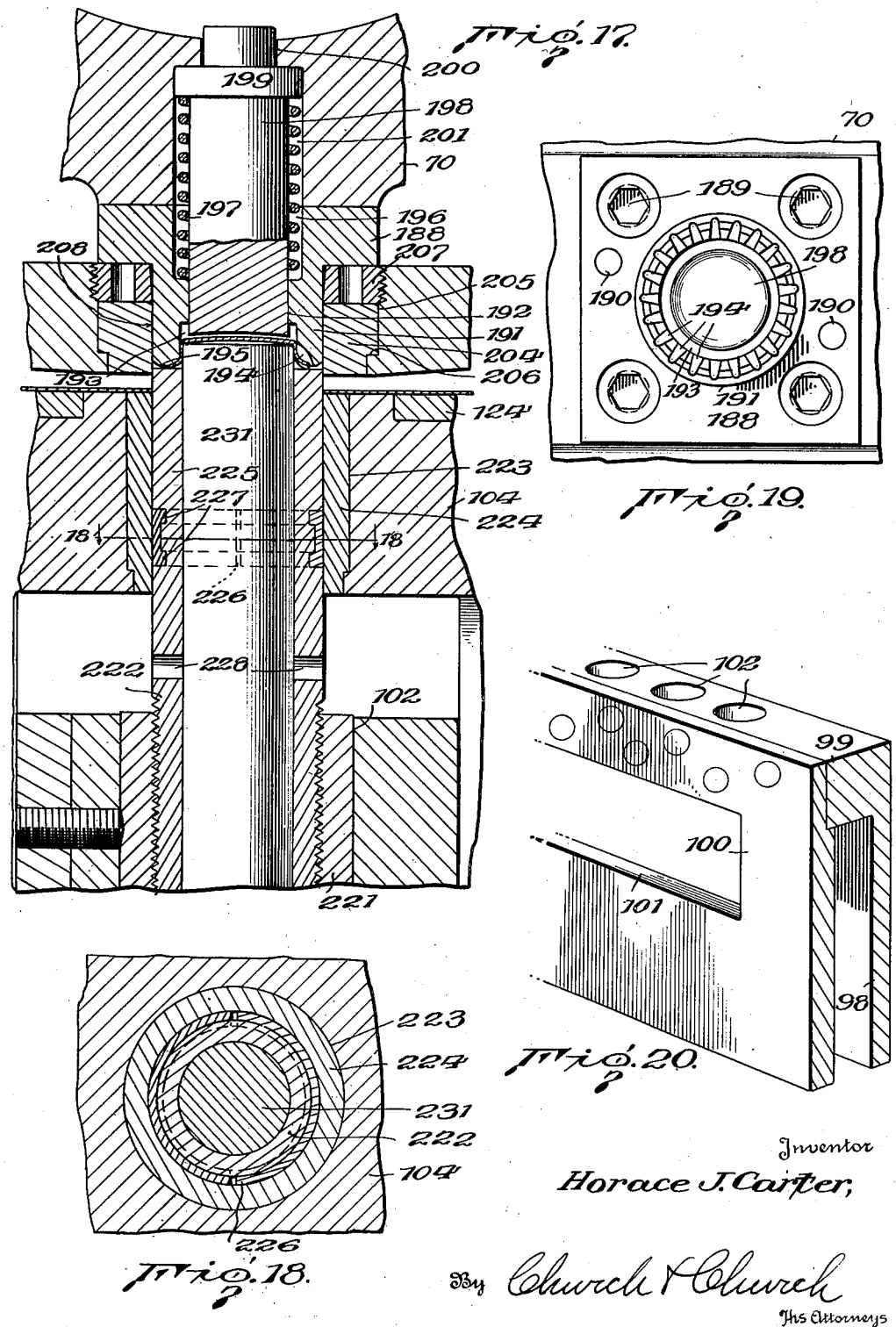

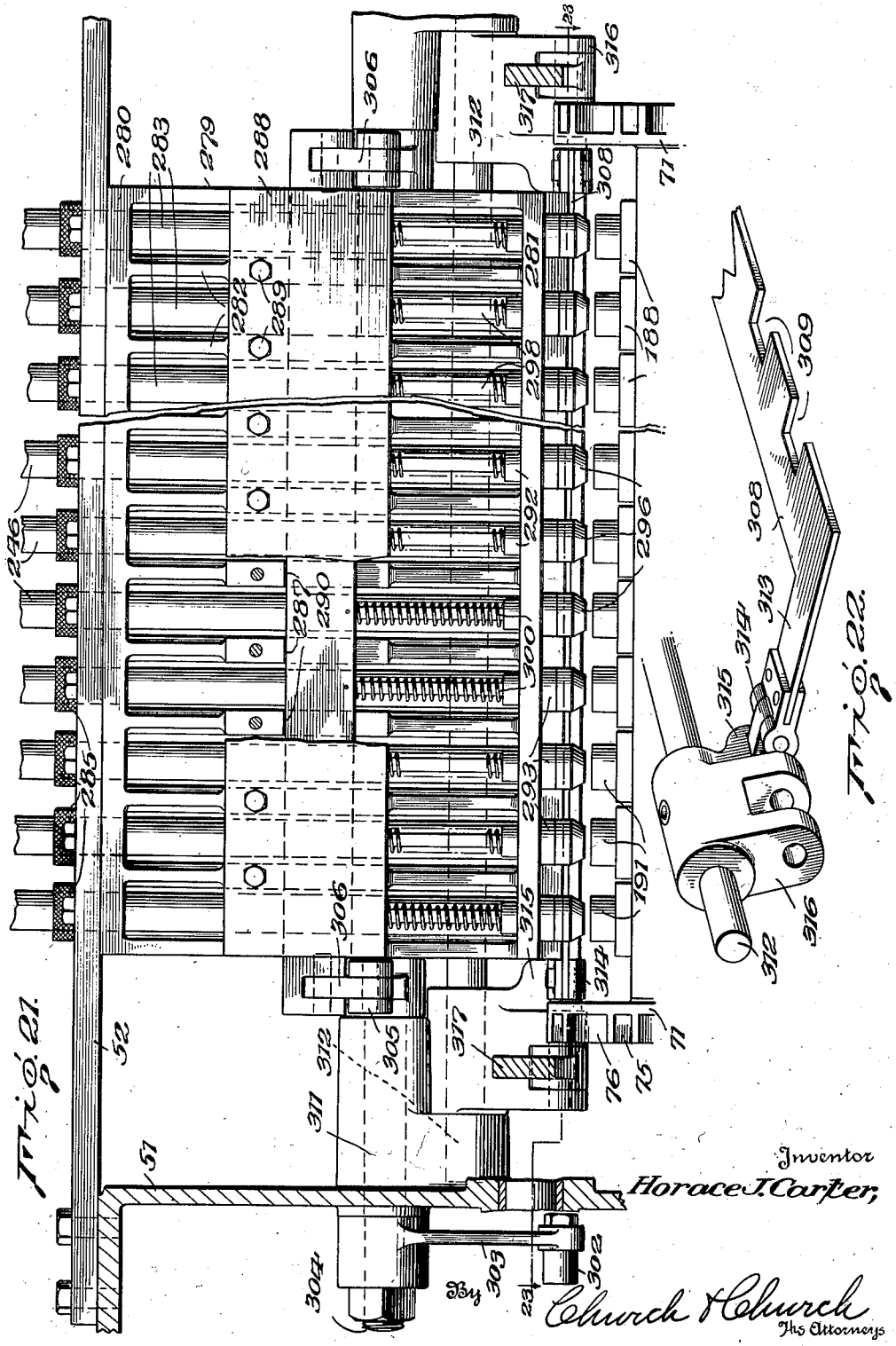

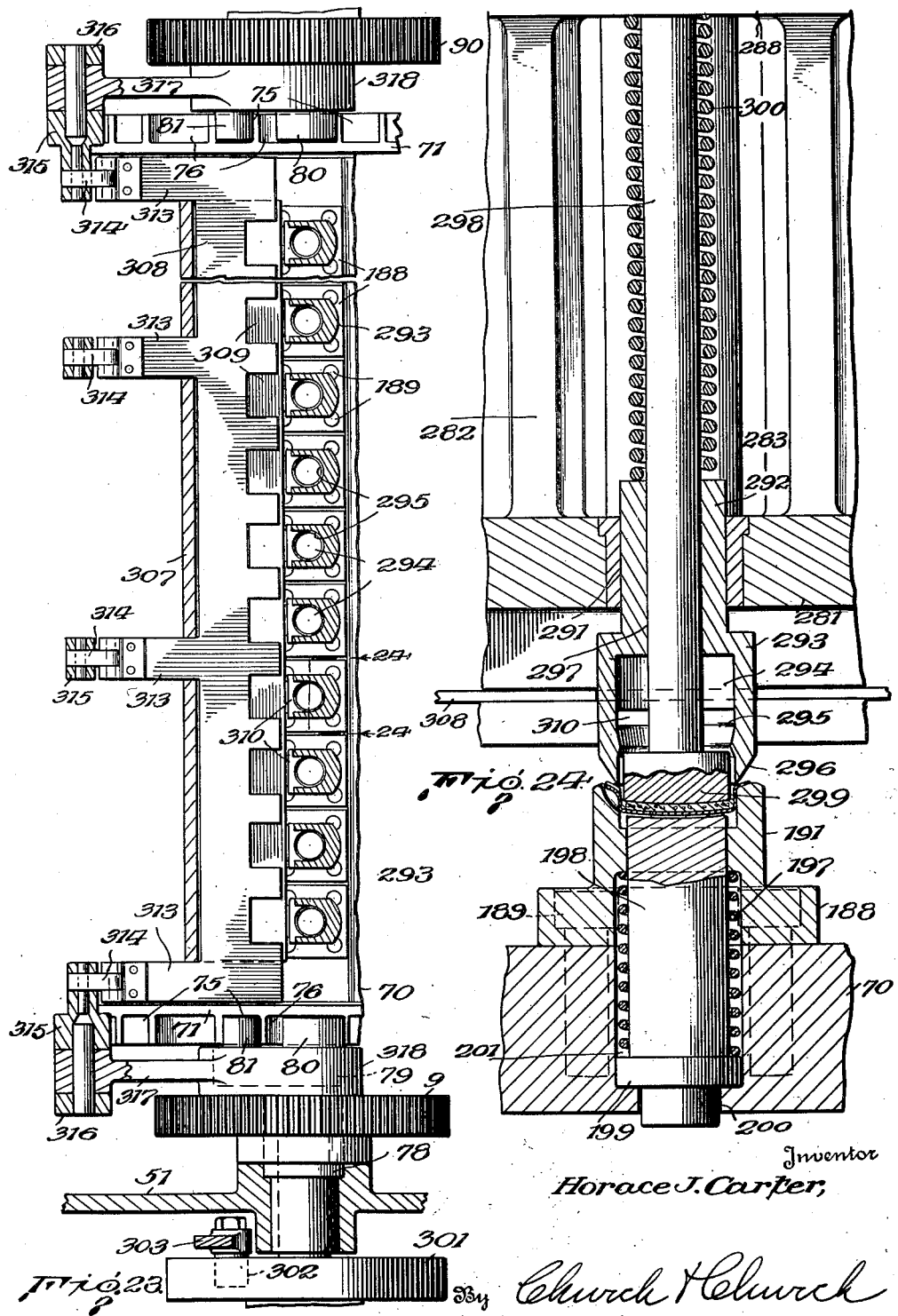

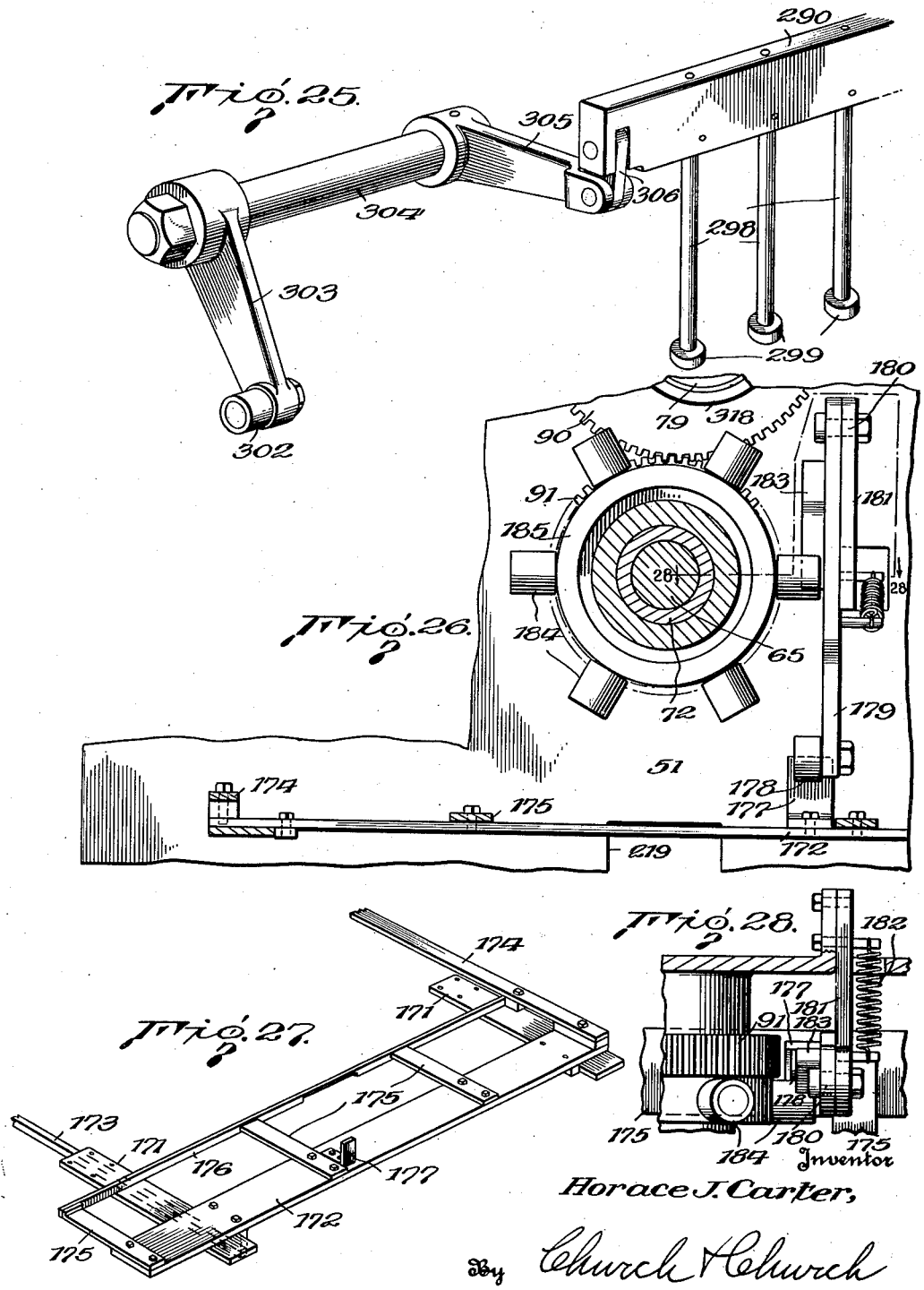

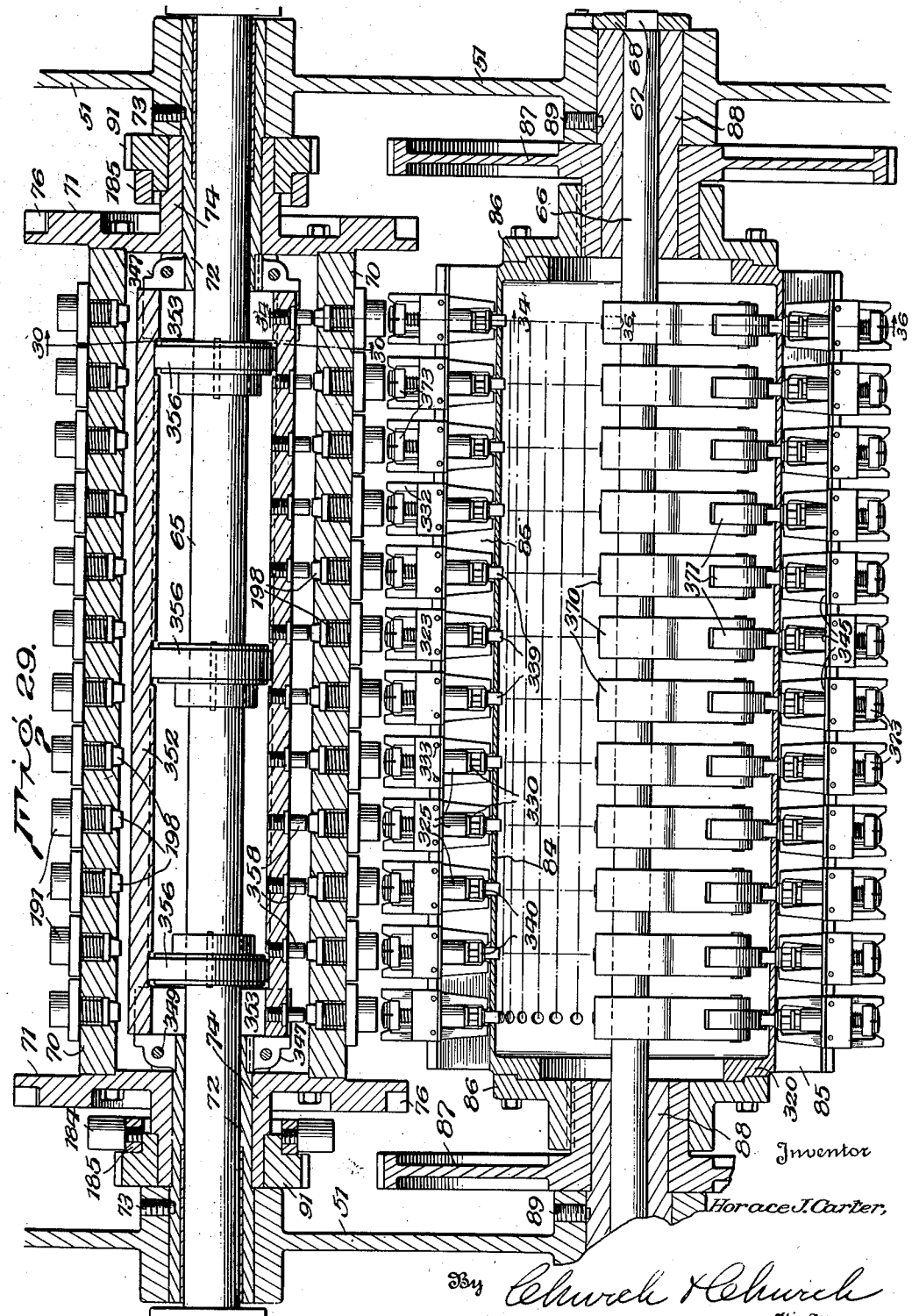

Dec. 19, 1933.  H. J. CARTER  1,940,581
AUTOMATIC MACHINE FOR MAKING BOTTLE CAPS
Filed July 18, 1932   23 Sheets-Sheet 17
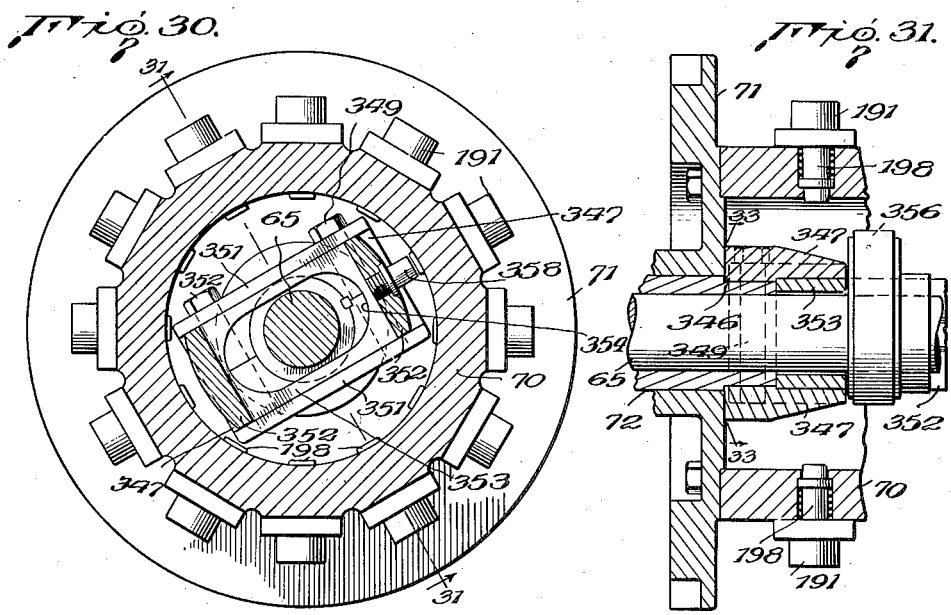
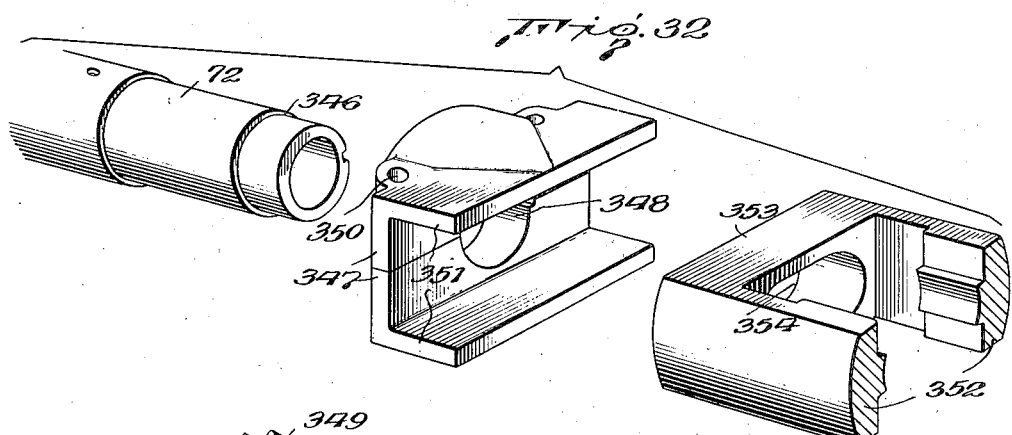
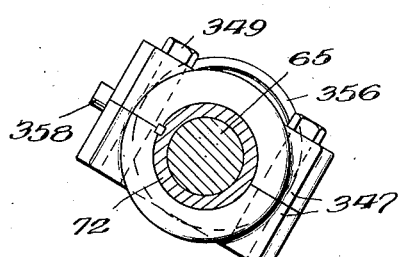
Inventor
Horace J. Carter,
By Church & Church
His Attorneys

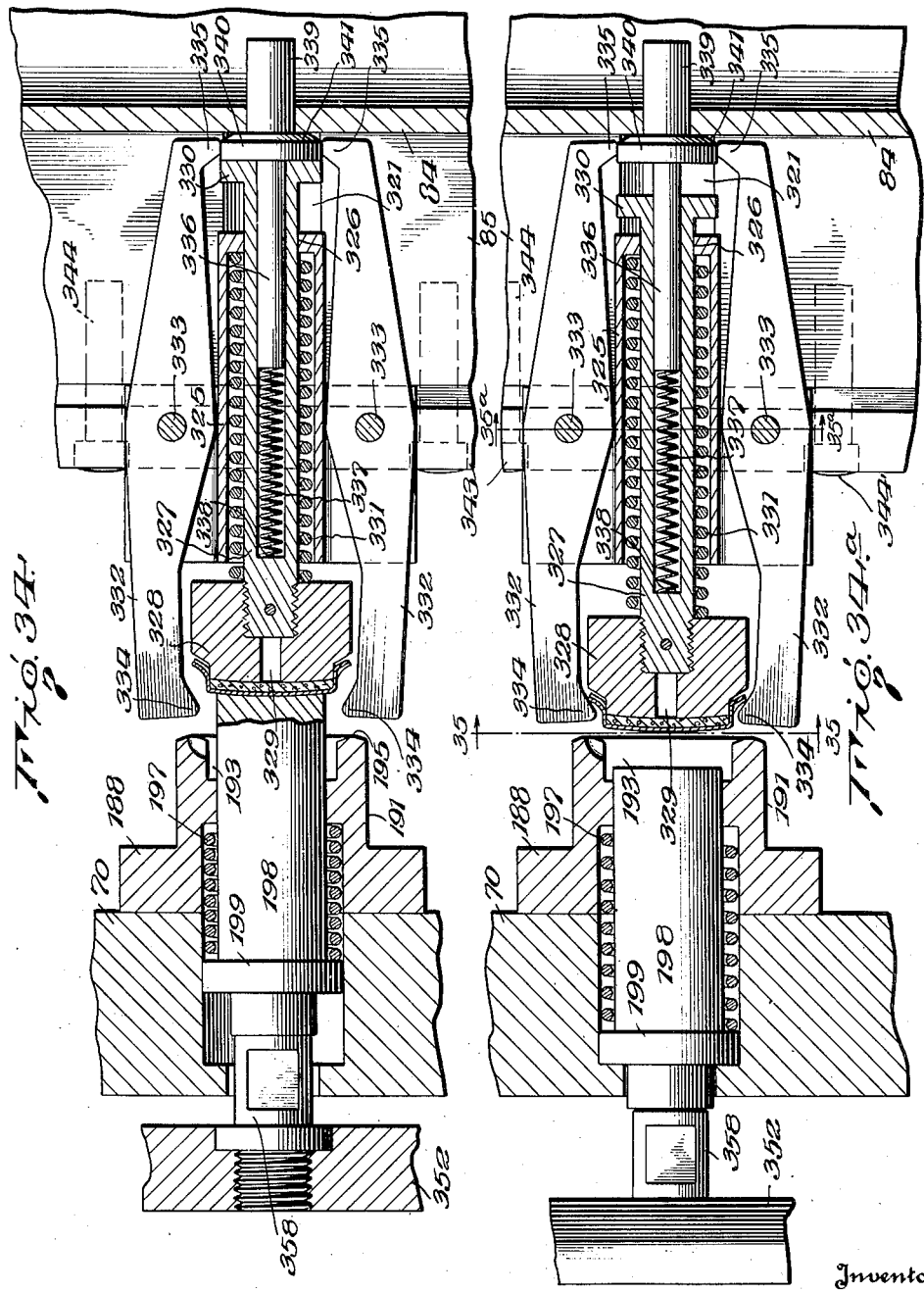

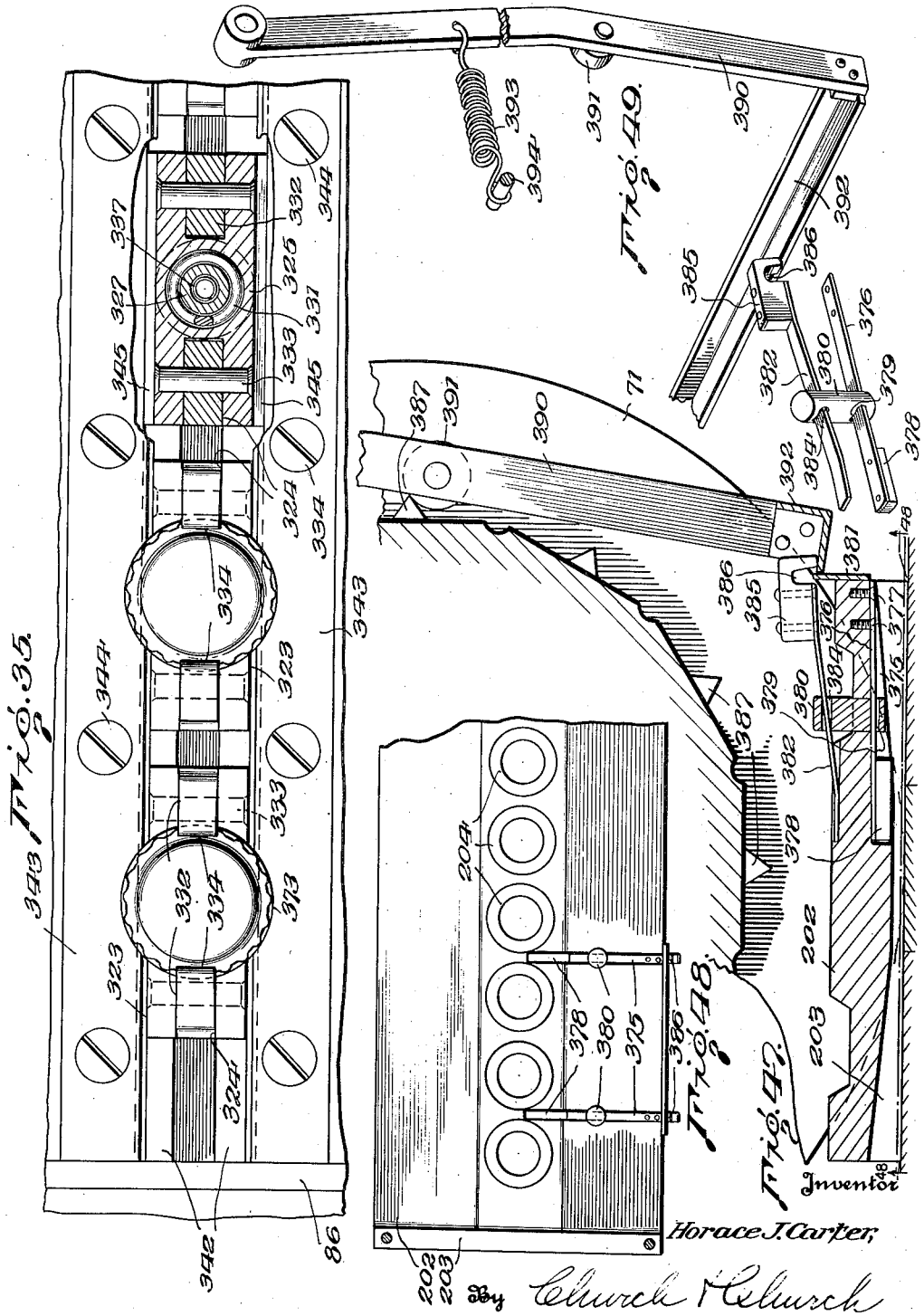

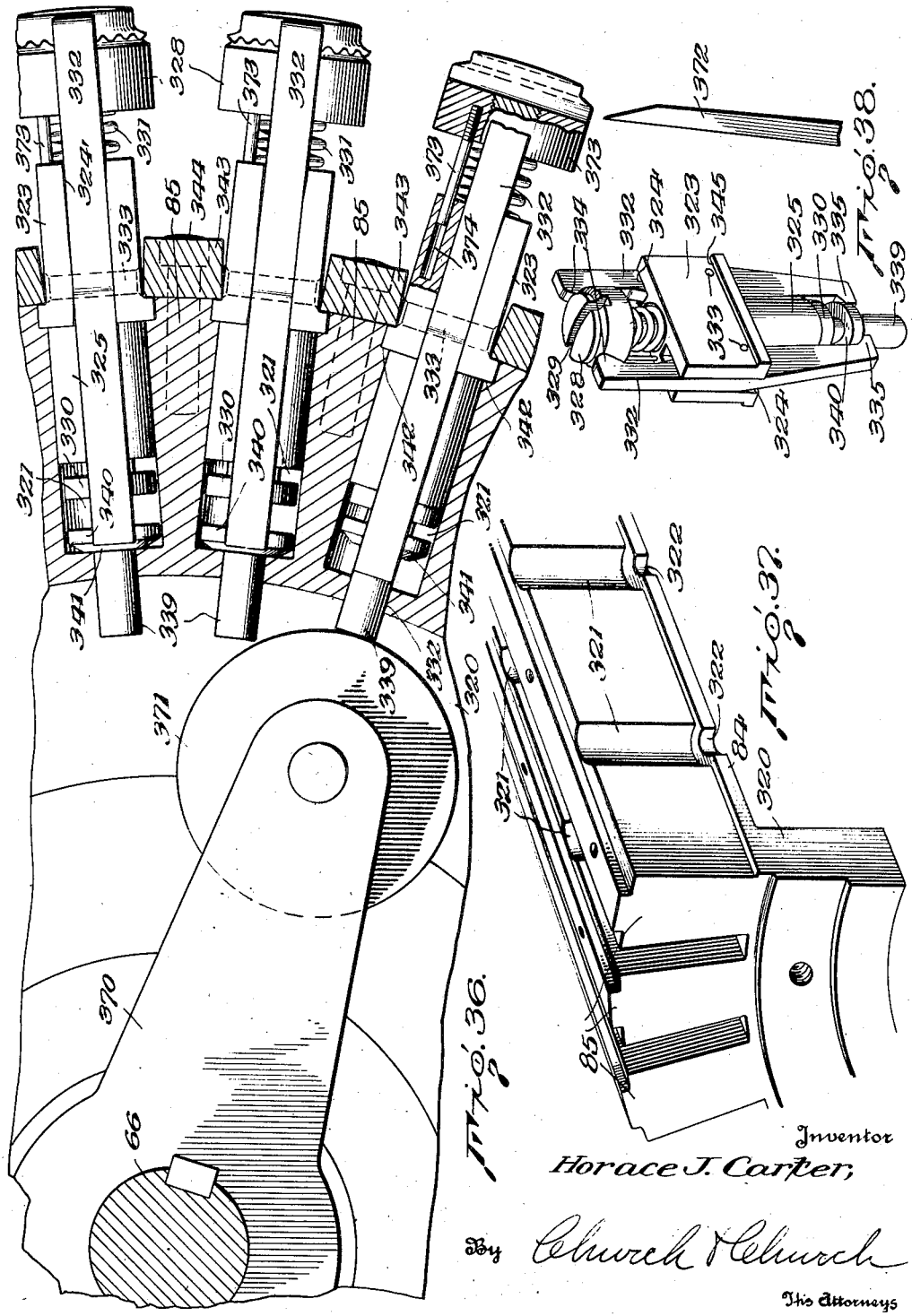

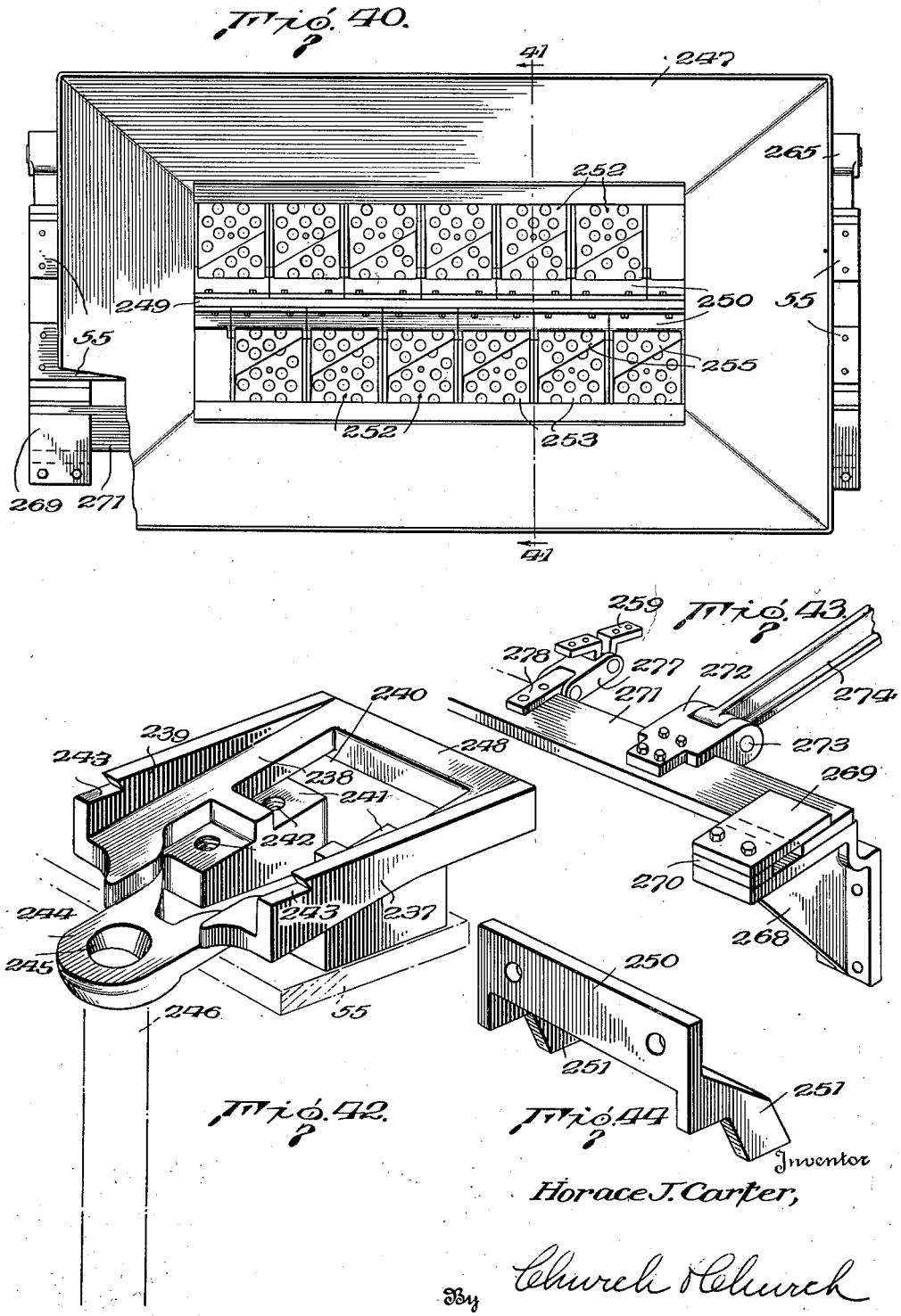

Dec. 19, 1933.  H. J. CARTER  1,940,581
AUTOMATIC MACHINE FOR MAKING BOTTLE CAPS
Filed July 18, 1932  23 Sheets-Sheet 22
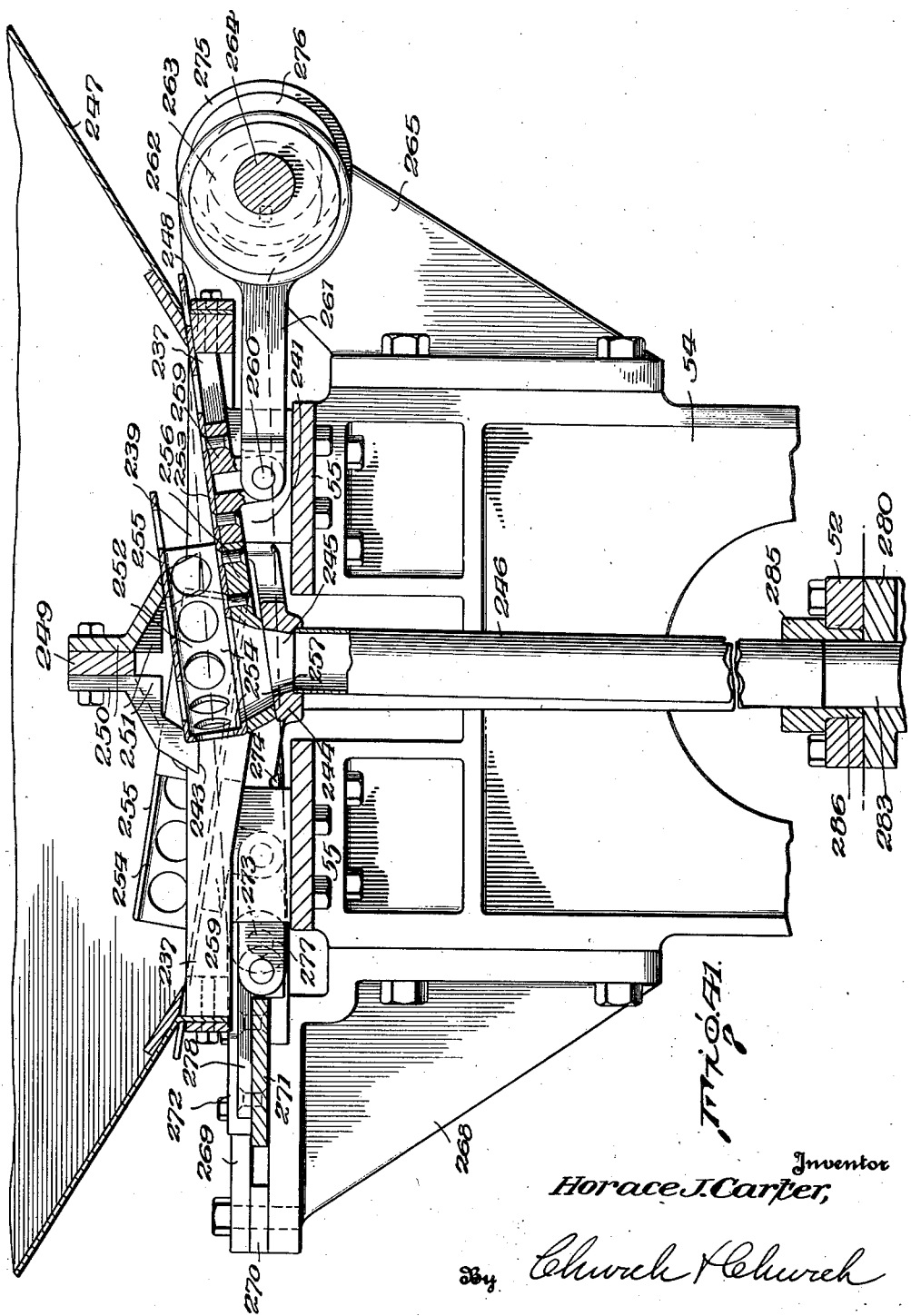

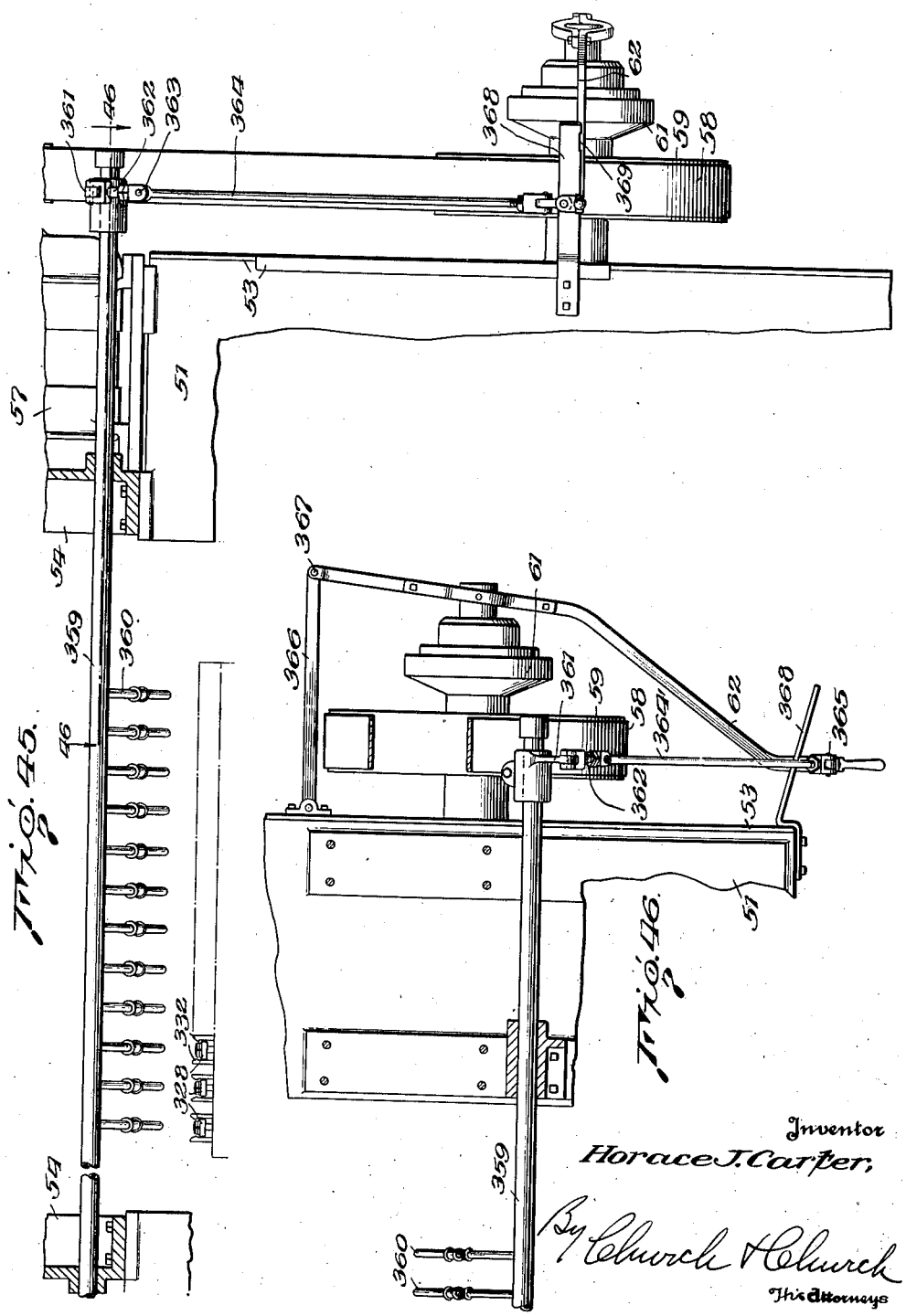

Patented Dec. 19, 1933

1,940,581

UNITED STATES PATENT OFFICE 1,940,581

AUTOMATIC MACHINE FOR MAKING BOTTLE CAPS

Horace J. Carter, Brenford, Del., assignor to Bond Manufacturing Corporation, Wilmington, Del., a corporation of Delaware Application July 18, 1932. Serial No. 623,260

32 Claims. (Cl. 113—1)

My invention relates to improvements in automatic machines for making bottle caps and has to do, more particularly, with automatic machines for forming metal caps from a sheet of metal, and inserting cork disks therein.

Crown caps for capping bottles usually comprise a metal body having a fluted edge or flange, and a cork disk inserted in the cap and forming a gasket for the mouth of the bottle. The principal object of my invention is to provide a machine for making and assembling such caps, automatically, from sheets of metal and cork disks which are fed to the machine. A further object of my invention is to provide such a machine which will produce the completed caps in large quantities, at high speed and low labor cost.

Decorated caps, that is, caps having printing, lettering or other decoration on the tops thereof, are customarily made by punching the cap disks from a sheet of metal upon one side of which the printing, lettering or decoration has previously been applied. The manufacture of decorated caps presents a special problem in this industry, because as the partly completed caps are stored together in bins or receptacles, or handled in hoppers, in the course of manufacture, the sharp edges of the caps are apt to scratch and disfigure the decorated tops. It is a further object of my invention, therefore, to provide a machine in which each cap is kept separate and apart from the others throughout the course of manufacture, from the time the disks of which the cap is formed are blanked from the metal sheet until the caps are discharged as finished product from the machine. Thus, the scratching and disfiguring of the decorated tops is avoided.

A further object of my invention is to provide an improved sheet-feeding mechanism by which the metal sheets are automatically fed to the machine in such a way that the caps are blanked therefrom with a minimum of scrap loss.

A further object of my invention is to provide an automatic machine for making and assembling bottle caps, in which the cork gasket disks are automatically inserted in the bottle caps while the latter are held in the die members in which they were formed.

It is a further object of my invention to provide an automatic machine for making and assembling bottle caps, in which successive operations on the caps are performed at successive stations of an intermittently moving assembly head, the caps being blanked from a sheet of metal and formed at a single station of the assembly head.

It is a further object of my invention to provide an automatic machine for making and assembling bottle caps in which the caps are blanked from a sheet of metal and formed, cork disks are positioned within the caps, and the caps are heated to cement the disks in place.

I am aware of a machine heretofore constructed in which the cap disks are blanked from a sheet of metal at one station, carried by an assembly head to a second station at which they are formed into caps, the formed caps being carried by the assembly head to a third station at which cork disks are inserted therein and then transferred to a transfer drum on which the caps are heated prior to discharge. I do not intend to claim such machine, or any part thereof, as my invention. The above-mentioned machine was unsatisfactory and inoperative due to the impossibility of keeping the blanked disks in registry while passing from the blanking to the forming station. It is an object of my invention to provide improvements upon said machine rendering it operative, said improvements consisting chiefly in mechanism whereby the blanking and forming operations are performed at a single station and means for preventing overfeeding of the metal sheets.

Further objects, and objects relating to details and economies of construction and operation will definitely appear from the detailed description to follow. In one instance, I have accomplished the objects of my invention by the devices and means set forth in the following specification. My invention is clearly defined and pointed out in the appended claims. A structure constituting a preferred embodiment of my invention is illustrated in the accompanying drawings, forming a part of this specification, in which:

Figure 1 is a view in end elevation of a machine for making crown caps, embodying my invention;

Figs. 2 and 2a, together, constitute a view of said machine, in front elevation;

Fig. 3 is a vertical, sectional view of the machine, taken on the line 3—3 of Figs. 2 and 2a, showing the mechanism for imparting a step by step movement to the assembly head and transfer drum;

Fig. 4 is a horizontal, sectional view, taken on the line 4—4 of Fig. 3, and showing the mechanism for feeding to the assembly head the sheet of metal, from which the caps are formed;

Fig. 5 is a detail, sectional view, taken on the line 5—5 of Fig. 4, showing a part of the sheet-feeding mechanism;

Fig. 6 is a detail, sectional view, taken on the line 6—6 of Fig. 4, showing the mechanism for imparting a step-by-step movement to the sheet-feeding device;

Fig. 7 is a fragmentary, perspective view of the pawl and ratchet mechanism shown in Fig. 6;

Fig. 8 is a vertical, sectional view, taken on the line 8—8 of Fig. 3, showing the mechanism for imparting the requisite movements to various parts of the machine;

Fig. 9 is a vertical, sectional view, taken on the line 9—9 of Fig. 8;

Fig. 10 is a vertical, sectional view, taken on the line 10—10 of Fig. 8, showing the means for blanking and forming the metal caps, the means for inserting cork disks therein, and the means for transferring the assembled caps to the transfer drum;

Fig. 11 is a vertical, sectional view taken on the line 11—11 of Fig. 8, showing the operating means for the blanking devices;

Fig. 12 is a fragmentary, perspective view of certain of the parts shown in Fig. 11;

Fig. 13 is a vertical, sectional view, taken on the line 13—13 of Fig. 2, showing the feeding table in the elevated position which it occupies in the forming of a cap, the other parts being in the same corresponding position;

Fig. 14 is a horizontal, sectional view, taken on the line 14—14 of Fig. 13;

Fig. 15 is a perspective view of one of the forming punches;

Fig. 16 is a perspective view of one of the brackets, by which the forming punches are mounted upon the cross head;

Fig. 17 is an enlarged, fragmentary, sectional view, corresponding to a part of Fig. 13, and showing the parts in position for the formation of a metal cap;

Fig. 18 is a detail, sectional view, taken on the line 18—18 of Fig. 17;

Fig. 19 is a bottom plan view of one of the die members, with which the forming punches co-operate to form the metal caps;

Fig. 20 is a fragmentary, perspective view of the blanking cross head;

Fig. 21 is a fragmentary, enlarged, vertical, sectional view, taken on the line 21—21 of Fig. 3, showing the mechanism for inserting the cork disks in the metal caps, parts being broken away for clearness in illustration;

Fig. 22 is a detail, perspective view of a portion of the feed plate and operating mechanism therefor, which feeds the cork disks into position for insertion in the metal caps;

Fig. 23 is a horizontal, sectional view, taken on the line 23—23 of Fig. 21;

Fig. 24 is an enlarged, vertical, sectional view, taken on the line 24—24 of Fig. 23, and showing the parts in position to insert a cork disk in a metal cap;

Fig. 25 is a detail, perspective view of a portion of the bar carrying the disk-inserting plungers, and the mechanism for actuating said bar;

Fig. 26 is a fragmentary, vertical, sectional view, taken on the line 26—26 of Fig. 8, and showing the mechanism for actuating the lateral shift devices of the sheet-feeding mechanism;

Fig. 27 is a perspective view of the frame, and its support, by which the sheet is shifted laterally by the sheet-feeding mechanism;

Fig. 28 is a detail, sectional view, taken on the line 28—28 of Fig. 26;

Fig. 29 is a sectional view, taken on the line 29—29 of Fig. 10, and showing the mechanism for transferring the caps from the assembly head to the transfer drum, and the mechanism for releasing the caps in order that they may be discharged from said drum;

Fig. 30 is a detail, sectional view, taken on the line 30—30 of Fig. 29, showing the means for actuating the devices by which the caps are transferred from the assembly head to the transfer drum;

Fig. 31 is a detail, sectional view, taken on the line 31—31 of Fig. 30;

Fig. 32 is a separated, perspective view of the parts shown in Figs. 30 and 31;

Fig. 33 is a detail, sectional view, taken on the line 33—33 of Fig. 31;

Fig. 34 is an enlarged, sectional view, taken on the line 34—34 of Fig. 29, and showing the parts in position to transfer a cap from the assembly head to the transfer drum;

Fig. 34a is a similar view, showing the parts in the position they occupy when the transfer is completed.

Fig. 35 is a fragmentary, detail view, taken substantially on the line 35—35 of Fig. 34a, showing two caps held in position on the transfer drum, certain of the parts being shown in section on a line corresponding to 35a—35a of Fig. 34a;

Fig. 36 is an enlarged, sectional view, taken on the line 36—36 of Fig. 29, and showing the means for discharging the caps from the transfer drum;

Fig. 37 is a fragmentary, perspective view of a portion of the transfer drum;

Fig. 38 is a perspective view of the devices by which the caps are retained upon the transfer drum, until the discharge station is reached;

Fig. 39 is a horizontal, sectional view, taken on the line 39—39 of Fig. 3, and showing the bottom of the hopper containing the cork disks to be inserted in the caps;

Fig. 40 is a top plan view of said hopper;

Fig. 41 is a vertical, sectional view, taken on the line 41—41 of Fig. 40, and illustrating the mechanism for feeding the cork disks from the hopper;

Fig. 42 is a detail, perspective view of a portion of the mechanism for feeding cork disks from the hopper;

Fig. 43 is a fragmentary, perspective view of the agitating mechanism forming a part of the device by which the cork disks are fed from the hopper;

Fig. 44 is a detail, perspective view of one of the frame members forming a part of the cork disk hopper feed;

Fig. 45 is a fragmentary view, in front elevation, showing the burners for heating the assembled caps before discharge from the transfer drum, together with the means for automatically moving said burners into operative position with respect to the transfer drum;

Fig. 46 is a detail view, taken on the line 46—46 of Fig. 45;

Fig. 47 is a fragmentary, vertical, sectional view, taken on the line 47—47 of Fig. 4, showing the actuating devices for the sheet stop;

Fig. 48 is a fragmentary, plan view of the sheet stop, taken on the line 48—48 of Fig. 47; and Fig. 49 is a fragmentary, perspective view of the sheet stop actuating devices.

In the drawings, the same reference numerals refer to the same parts throughout the several views, and the sectional views are taken looking in the direction of the arrows at the ends of the section lines.

The machine, which constitutes a preferred embodiment of my invention and is illustrated in the accompanying drawings, comprises, in general, a rotating assembly head, a rotating transfer drum, a sheet-feeding mechanism, means for blanking and forming caps upon the assembly head, and means for feeding cork disks to the proper point for insertion in caps held upon the assembly head. A sheet of metal, from which the caps are to be blanked and formed, is presented by the sheet-feeding mechanism to the assembly head. The assembly head carries a series of forming devices and, at the blanking and forming station, metal disks are punched from the sheet of metal presented by the sheet-feeding mechanism and formed by the forming devices into the required shape. It is important that the blanking and forming be accomplished at the same station, because it is difficult to hold blanked cap disks in proper registry while passing from a blanking station to a forming station. In this machine, therefore, the assembly head comprises a series of rows of female forming dies brought successively into co-operation with a row of blanking dies which blank disks from the metal sheet and form them into the required shape in co-operation with the forming dies. The assembly head, in the machine illustrated, comprises twelve rows of forming devices, arranged equidistantly from each other, and there are twelve of the forming devices in each row. An intermittent or step-by-step movement is imparted to both the assembly head and the transfer drum, so that each of the rows of forming devices, successively brought to the blanking and forming station, remains there for an interval sufficient to blank and form the caps, and then moves away, carrying the formed caps therewith, and the next adjacent row of forming devices moves to the blanking and forming station. The blanking and forming devices not only act to cut the cap from the metal of the sheet and form it, but the forming dies also retain the formed caps upon the assembly head during about two-thirds of a revolution of that head. Thus, the step-by-step rotation of the assembly head carries the formed caps, with what will ultimately be the inner surface thereof outermost, around to a station at the upper part of the machine, at which a cork disk is inserted into each cap by disk-feeding mechanism. The further rotation of the assembly head from the disk-inserting station, carries the caps, with the disks therein, to a transfer station, at which the caps are released from the forming devices and transferred, with their tops outermost, to holding devices upon the transfer drum. The transfer drum is also rotated with a step-by-step movement, and, when the assembled caps have been transferred to it, the step-by-step movement of the transfer drum carries these caps beneath flames which play upon them from gas burners, so as to heat the caps. That side of the sheet of metal, from which the caps are formed, which becomes the inner surface of the caps, is coated with a lacquer, such as is well-known in this art, which softens, under heat, to form an adhesive, and, when the caps are thus subjected to the gas flames, this lacquer softens and causes the inserted disks to adhere firmly to the inner surfaces of the caps. The assembled disks are firmly held on the transfer drum during a considerable portion of a revolution, subsequent to the application of heat thereto, this interval being long enough to permit the setting of the adhesive lacquer, after the application of heat, with the result that, when the assembled caps reach the discharge station, at which the holding devices are operated to release the caps and discharge them, the lacquer has set, so that the disks are firmly cemented in place.

The framework of the machine comprises a base 50, from which rise the two channel-shaped side members 51. The upper ends of the side members 51 are tied together by the cross bar 52. These channel-shaped side members 51 constitute housings for part of the operating mechanism and are closed in by the end plates 53, secured thereto. The side members 51 are suitably formed to provide bearings for the operating shafts carried thereby. Upon the upper ends of the side members 51 are mounted the standards 54 which support the hopper for the cork disks, and the disk-feeding mechanism, and these standards are tied together by cross bars 55. Brackets 56, mounted upon one of the side members 51, support the electric motor 57, which furnishes the motive power for the machine. The motor 57 is connected by belt 58 to a pulley 59, which is connected by a clutch 61 to the drive shaft 60. The clutch is operated by the clutch lever 62 to throw the machine into and out of operation. The drive shaft 60 is journaled in the side members 51. As shown in Fig. 9, a gear 63, fixed on the drive shaft 60, meshes with a gear 64, fixed on the shaft 65, which is journaled in the side members 51 and is coaxial with the assembly head. As will be described later, the assembly head is journaled in the frame so as to rotate about an axis coincident with the shaft 65, but the shaft 65 may, and does, have movement independently of the assembly head. The transfer drum is journaled upon the side members 51 so as to rotate about an axis coincident with that of the fixed trip shaft 66. As shown in Fig. 29, the ends of the shaft 66 are squared, at 67, and received in square holes in plates 68, which are fastened to the frame members by the bolts 69 (Fig. 9). Thus, the trip shaft 66 is so supported that it is fixed against rotation.

The assembly head comprises a drum formed of the substantially cylindrical side wall 70 (Figs. 8, 10 and 29) and the two end plates 71, which are bolted to this side wall. Bushings 72 are mounted in the side members 51 of the frame, being keyed thereto by the set screw 73, and surround the shaft 65. The hubs 74 of the end plates 71 are journaled on the inwardly projecting ends of these bushings. Thus, the assembly head is mounted so as to rotate about an axis coincident with that of the shaft 65, but independently of said shaft. The assembly head is caused to rotate with an intermittent or step-by-step movement by the well-known Geneva movement, one of which is provided at each end of the assembly head. Each of the end plates 71 of the assembly head is provided, on its outer face, with slots 75 and semi-cylindrical recesses 76, disposed between the slots. At each end of the assembly head, there is provided a shaft 77, for driving the Geneva movement, which shaft is journaled in the corresponding side member of the frame, as shown in Fig. 8. Surrounding the inner end of this shaft, there is a bushing 78, which is mounted in the frame member 51. Upon the inner end of each shaft 77, there is provided an eccentric 79 which carries a half-round projection 80, for engagement in the semi-cylindrical recesses 76 of the end plate 71, the semi-cylindrical surface of said member 80 being concentric with the axis of shaft 77. The eccentric 79 also carries a pin 81, for engagement in the slots 75 of the end plate. As already pointed out, the pinion 63 on the drive shaft 60 (Fig. 9) meshes with a gear 64, which is fast on shaft 65. Gear 82 is also fixed on shaft 65 and meshes with gear 83, which is fixed on shaft 77. Thus, the shaft 77 is caused to rotate continuously. Referring to Fig. 3, the shaft 77 is turning in a counter-clockwise direction. The projecting member 80 is lodged in one of the recesses 76 and, hence, holds the assembly head against movement. As the shaft 77 rotates, the projection 80 will be removed from the recess 76 and, when this happens, the rotation of the eccentric 79 will cause the pin 81 to engage in the next adjacent slot 75 and rotate the assembly head, in a clockwise direction, one step. At the end of this step, the rotation of shaft 77 will have caused the half-round projection 80 to engage in the next adjacent recess 76, in which it is lodged during a little more than half a revolution of the shaft 77, holding the assembly head against movement during such half revolution. This is the old and well-known Geneva movement and one of these, as already stated, is applied at each end of the assembly head, so as to cause that head to rotate intermittently with a step-by-step movement, and to hold the head stationary between the intervals of movement.

The transfer drum comprises a substantially cylindrical side wall 84, provided with a plurality of radially extending ribs 85, as shown in Fig. 37, for a purpose to be described hereinafter. To the ends of this side wall, there are bolted the end plates 86 (Fig. 29), which are keyed to the hubs of gears 87. Surrounding the ends of the shaft 66, there are bushings 88, which are fixed with respect to the side members 51, by the set screws 89. The hubs of the gears 87 are journaled upon the inwardly projecting portions of the bushings 88. The gears 87, as shown in Fig. 10, mesh with the gears 90, which are journaled on the bushings 78 surrounding the shafts 77. The gears 90, in turn, mesh with the pinions 91, which are keyed to the hubs of the end plates 71 of the assembly head. Thus, the transfer drum is caused to rotate with an intermittent movement in step with the rotation of the assembly head, so that the transfer drum moves when the assembly head is moving, and is stationary when the assembly head is stationary.

To each of the side members 51 of the frame, there are secured guides 92, as indicated in Figs. 1, 8 and 11. These serve to guide the reciprocating movement of the hanger members 93, which straddle the shaft 65, as shown in Figs. 8 and 11. Each hanger carries, at its upper end, a pin 94, on which a roller 95 is journaled. Upon the shaft 65, at each end of the assembly head, there are fixed cams 96, which engage the corresponding rollers 95 of the hangers 93. Likewise, on the shaft 77, there are fixed cams 97, which also engage the upper sides of the rollers 93. Thus, as the shafts 65 and 77 rotate, the hangers 93 are caused to reciprocate in the guides 92. The lower ends of the arms of the U-shaped hangers 93 are bolted to a hollow cross head 98, which extends beneath the assembly head from one end thereof to the other, the position of this cross head, with respect to the assembly head, being shown in Fig. 10. The cross head 98 is of channel shape, in cross section, and comprises a plate 98 (Fig. 20), having a laterally projecting shoulder 99 at its upper edge, to which the upper portion of a plate 100 is rigidly secured. An opening 101 is provided in the side of the plate 100, to permit the operation of other parts to be described later. Cylindrical bores 102 are formed in the shoulder 99 of the cross member to receive, and permit the reciprocation of, the forming punches.

Brackets 103 are secured to the sides of the cross head 98, as shown in Figs. 2, 10 and 13. The cross head 98 also carries a table 104, which extends from one side of the machine to the other underneath the assembly head, as shown in Fig. 10. The end portions 105, of this table are wider than the central portion thereof, as shown in Fig. 4. From each of the end portions 105 of the table, project downwardly the bracket members 106, which are spaced apart so as to form guides, engaging the front and rear faces of the cross head 98. The bracket members 106, at the rear of the table, are also connected by the rear wall 107, which engages the rear face 98 of the cross head. Thus, these guide members straddle the cross head 98, and the table is carried by it, but in such a way that it may be said to float thereon. An opening 108 is provided in the wall 107, for a purpose to be described hereinafter. Pins 109 are carried by the end portions 105 of the table and extend downwardly therefrom, being provided with the heads 110. These pins extend through holes provided in the flanges 111, extending laterally from the upper ends of the brackets 103, the heads 110 being located below said flanges. Springs 112 surround the pins 109 and are interposed between the under surfaces of the end portions 105 of the table, and the upper surfaces of the flanges 111 of brackets 103. Springs 113 are provided, the lower ends of which surround studs 114, projecting upwardly from the base 50, while the upper ends of these springs surround sleeves 115, which engage the under surfaces of the flanges 111 of brackets 103. The upper portion of the bore of each sleeve 115 is enlarged to form a chamber 116, receiving the head 110 of pin 109. Thus, the table, which is carried by the cross head 98, is yieldably mounted, or cushioned, upon the springs 112, and the springs 113 serve as cushioning devices, taking a part of the load imposed upon the cross head 98. Stop bars 117 are provided, bolted to the base 50, and arranged with their upper ends in the path of the table 104, so as to limit the downward movement of said table and assist in stripping the blanking punches from the metal of the sheet.

To the upper surface of the table 104, there are rigidly secured the plates 118, 119 and 120, which extend forwardly from the table. Similarly, plates 122, 123 and 124 are secured to the top surface of the table and extend rearwardly therefrom. These six plates, together, form a sheet-supporting surface and they are spaced from each other, so as to provide a pair of parallel slots 121 in said surface, in which the feed chains 125 can run. The plates 118, 119 and 120 are, further, tied together by the cross bar 126, fastened to the forward edges thereof. A pair of brackets 127 (Fig. 3), secured to the forward portions of plate 119 and depending therefrom, support the shaft 128, which is journaled in said brackets. Shaft 128 carries the sprocket wheels 129 mounted thereon in alinement with the slots 121. Also, the plate 119 has secured thereto a pair of brackets 130, which depend therefrom adjacent the table 104. Each of these brackets carries a stub shaft 131. Upon the stub shafts 131, there are mounted the idler sprockets 132, in substantial alinement with the slots 121. The plate 123 has secured thereto a pair of brackets 133, which depend therefrom. Journaled in the brackets 133, adjacent the table 104, are a pair of stub shafts 134, on which the idler sprocket wheels 135 are mounted, in substantial alinement with the slots 121. The brackets 133 also carry the drive shaft 136, which is journaled therein. Upon this drive shaft, there are keyed the sprocket wheels 137, mounted in alinement with the slots 121. The endless feed chains 125 extend around the sprockets 137, over the idler sprockets 135 and 132, around the sprockets 129, and then, in the slots 121, from the forward portion of the sheet-supporting surface to the rear thereof, where they engage, and pass around, the drive sprockets 137. The lower reaches of the chains 125 pass through the openings 108, formed in the wall 107 of the table structure. At intervals, the feed chains 125 carry the projecting dogs 138 of sufficient height to engage a sheet of metal laid upon the supporting surface, and move it forwardly, as the chains move, to present portions of this sheet, successively, to the blanking and forming devices. It will be noted that the idler sprockets 135 and 132 have recesses 139 formed therein to accommodate the dogs 138. The sheet of metal, from which the caps are to be blanked and formed, is laid upon the supporting surface of the table, with one edge of the sheet abutting the stops 140 on the upper surfaces of plates 118 and 120, and the sheet remains in this position until the dogs 138 come along and engage the edge of the sheet and move it rearwardly on the supporting surface, to the blanking and forming devices.

Of course, the sheet of metal is to be advanced while the assembly head is moving from one station to the next, and the sheet is to remain stationary during the interval that the assembly head is stationary, and in which the blanking and forming is being done. The chains 125 therefore, are driven with an intermittent motion, in time with the driving of the assembly head. The machine is designed to operate upon sheets of metal of standard size, and these sheets are successively laid upon the supporting surface of the table, engaged and advanced to the blanking and forming devices by the dogs 138, upon the chains 125. There will be an interval between the rear edge of one sheet and the advancing edge of the next sheet, and, in order to compensate for this, the chains 125, at regular intervals corresponding with the finishing of work upon one sheet and the beginning of work upon another, are advanced, in the intermittent motion, three steps, instead of one. The mechanism by which the chains 125 are driven, so as to accomplish these results, will now be described.

A shaft 141 is journaled in one of the side members 51 of the frame, and in brackets 142 carried by the frame, as shown in Fig. 5. This shaft is connected by universal connections 143, with the shaft 136. Keyed upon the shaft 141, are the hubs 144 and 145 of the ratchet wheels 146 and 147, respectively. These ratchet wheels are arranged side by side, as shown in Fig. 5. The ratchet wheel 146 has but a single tooth in the periphery thereof, the balance of the periphery being cylindrical. The ratchet wheel 147 has teeth formed throughout the periphery thereof, there being twenty-eight teeth on the periphery of this particular wheel. Journaled upon the hub 145, is an arm 148, carrying a pin 149. Upon the pin 149, there is mounted a spring-pressed pawl 150 for co-operation with the teeth of the ratchet wheel 147. Upon the other end of the pin 149, there is mounted a spring-pressed pawl 151 for co-operation with the single tooth of the ratchet wheel 146. The pin 149 passes through the forked end 152 of a link 153, said forked end of the link being located between the pawls 150 and 151, so as to move in the space between the ratchet wheels 146 and 147. Upon the shaft 65, there is fixed a cam 154. Upon a pin 155, carried by the frame, there is journaled an arm 156, which carries a roller 157, engaging the periphery of cam 154. The arm 156 is connected, by pin 158, to the end of the link 153 opposite to the bifurcation 152. A spring 159 is connected, at one end, to the link 153 near the bifurcation 152, and, at the other end, to a bar 160, which extends from and is fastened to the frame.

It will be seen that, as the shaft 65 revolves, the link 153 will be reciprocated, causing the arm 148 to oscillate about the hub 145, and moving the pawls 150 and 151 with respect to the wheels 146 and 147. An arm 161 lies adjacent the outer face of the ratchet wheel 147 and has a split hub, which is clamped about a bushing 162 by means of the bolt 163. The bushing 162 is fixed with respect to the bracket 142, by the set screw 164. Thus, the arm 161 is fixed in position, although subject to adjustment. The outer end of the arm 161 projects slightly beyond the periphery of the adjacent ratchet wheel 147, as shown in Figs. 6 and 7. The pawl 150 has a tongue 165, which projects laterally so as to engage the outer end of the arm 161, as shown in Fig. 7. The width of the outer end of arm 161 is such that this arm engages the tongue 165, and holds the pawl 150 out of engagement with the teeth of the ratchet wheel 147, throughout a space which is the equivalent of two teeth on the periphery of said ratchet wheel.

As the cam 154 rotates, the link 153 is reciprocated and, as the link 153 moves toward the ratchet wheel, in Fig. 6, the tongue 165 rides over the outer end of the arm 161 and, then, drops therefrom, permitting the pawl 150 to come into engagement with a tooth of the ratchet wheel 147. The continued movement of the link 153, imparted to it by the cam 154, is sufficient to advance the ratchet wheel 147 one tooth. The advance movement of the pawl 151 is of the same extent, and takes place at the same time as the advance of the pawl 150, but the pawl 151 engages the wheel 146, which has but one tooth in the periphery thereof. When this tooth is not in the path of the pawl 151, that pawl merely rides idly over the cylindrical periphery. There is one point in the movement of the wheel 146, however, at which its single tooth will be in position to be engaged by the pawl 151, as it is advanced by the link 153. When this happens, the wheel 146, and, consequently, the shaft 141, to which it is keyed, will be advanced three steps instead of one. This means that the shaft 141 will have imparted to it twenty five single-step movements, followed by a three-step movement, after which the sequence will be repeated as before. The twenty five single-step movements take care of the normal movements of the sheet of metal, as the caps are being formed therefrom by the blanking and forming devices, and the three-step movement takes care of the transition from one sheet of metal to the next.

It is, of course, important that the feeding movements of the chains 125 should be accurate, in order that the sheet of metal may be presented properly for the action of the blanking and forming devices. To prevent inadvertent movements of the chains 125, and overthrow by the chain drive mechanism, a drum 166 is fixed on shaft 128.

A strap 167 is fastened, at one end, to the supporting structure of the table. This strap surrounds the drum 166, and the opposite end thereof is connected to a spring 168, which is also anchored to the supporting structure of the table. Thus, a braking force is applied to the shaft 128, which tends to prevent inadvertent movement thereof. A spring-pressed pawl 169 is mounted in a bracket 170, carried by the frame structure, and engages the teeth of ratchet wheel 147, so as to prevent reverse movement of this wheel and shaft 141, to which it is secured.

The blanking devices cut, from the sheet of metal, round disks, which are formed into the caps by the forming devices. It is well-known that, in order to reduce scrap loss to a minimum, the holes formed in the sheet of metal by the blanking devices should be staggered laterally with respect to each other. In order to accomplish this staggering of the punched holes automatically, I have provided a mechanism for shifting the sheet laterally, as it is fed forwardly to the action of the blanking and forming devices. That is to say, after a set of blanking and forming devices has operated upon the sheet of metal, and, while the sheet is being advanced one step, it is also shifted laterally so that the next row of holes formed by the blanking devices is staggered with respect to the preceding row. After this second row of holes has been formed by the blanking and forming devices, and while the sheet is being fed forwardly into position to form the third row of holes, the sheet is shifted laterally in the opposite direction, and so on. The mechanism, by which this is automatically effected, will now be described.

Straps 171 are secured to the lower surfaces of plates 118, 120, 122 and 124, and extend laterally therefrom, as shown in Fig. 4. These straps constitute supports for a frame. This frame comprises the side members 172, which are tied together by the cross bar 173, extending beneath the sheet-supporting structure and between the two reaches of the chains 125, and the cross bar 174, which extends over the chains 125, at the rear of the machine. Arms 175, secured to the side members 172, support two straight edges 176, which are spaced apart substantially the width of the sheet of metal to be operated upon, and are so located as to engage the side edges of a sheet of metal, as it lies upon the sheet-supporting surface formed by the plates 118, 119 and 120. It will be seen, therefore, that, as this frame is shifted laterally it will shift the sheet laterally upon the sheet-supporting surface, and such lateral shifting does not interfere with the forward feeding of the sheet by the chains 125.

Upon each side member 172, there is mounted an angle bracket 177. These angle brackets are engaged, as shown in Figs. 2 and 26, by rollers 178, carried on the lower ends of pivoted arms 179. The upper ends of the arms 179 are pivoted, at 180, upon brackets 181 carried by the frame. Springs 182 are fastened, at one end, to each arm 179 and, at the other end, to the frame, and tend to move the arms 179 in directions away from the assembly head. Each arm 179, also, carries a cam plate 183, the shape of which is shown best in Fig. 2. The cam plate 183, on the arm 179, cooperates with a series of rollers 184, mounted upon a ring 185 with their axes extending radially. Each gear 91, which is keyed to, and turns with, the assembly head (Fig. 8), has an annular shoulder 186 thereon, upon which a ring 185 is mounted, being secured thereto by the set screws 187. Consequently, the rings 185 turn with the assembly head. Thus, one of these rings is provided with radially extending rollers, at each end of the assembly head, but the rollers on the right-hand ring, referring to Fig. 2, are staggered with respect to the rollers on the left hand ring. For instance, in the machine illustrated, the assembly head comprises twelve rows of forming dies, and the rollers upon the right-hand ring 185 are arranged opposite alternate rows of dies, whereas the rollers upon the left-hand ring, being staggered, are arranged opposite the other set of alternate rows of dies. Consequently, the right-hand arm 179, in Fig. 2, will be swung to the right by the engagement of the cam 183 with a roller 184, once for every two steps of movement of the assembly head. Likewise, the arm 179, at the left of the assembly head, will be swung to the left by engagement of the cam 183, with a roller 184 once for every two steps of movement of the assembly head, but the movement to the right, of the right-hand arm 179, alternates with the movement to the left, of the left-hand arm 179. Consequently, each time the sheet of metal is advanced, the frame will be shifted alternately from right to left, and vice versa. The cams 183 and rollers 184 are so located that this lateral shifting movement takes place, while the assembly head is moving from one position or station to the next, and this movement is, also, so timed that it does not take place until the punches have descended out of the holes in the sheet of metal.

As already stated, while the assembly head is at rest, blanking and forming devices operate to cut a series, in this case, twelve, disks of metal from the sheet and form these disks into the metal caps. The operation of these blanking and forming devices will now be described.

The side walls 70, of the assembly head, have a series of parallel longitudinally extending ribs on the exterior thereof. In the particular machine illustrated, there are twelve of these ribs. Upon each of these ribs, there is mounted a series of female forming dies, in this case, twelve, arranged side by side, as shown in Fig. 2. One of these die members is shown, in bottom plan view, in Fig. 19. Each of these die members comprises a block 188, which is secured to the rib on the assembly head, by the countersunk bolts 189 and the dowel pins 190. Projecting from the block 188, and centrally arranged thereon, is a cylindrical projection 191. In the block 188, and the projection 191, is a central bore 192. The outer end of this bore is enlarged to form a cylindrical recess 193, from which radiate the fluted grooves 194, constituting the female die portions to give the desired shape to the cap. The lower end of the projection 191 is rounded, as shown at 195, into the shape requisite to form the lip of the cap. In other words, the recess in the outer, or lower, end of the projection 191 is given the necessary shape to act as a female die in the forming of the cap. The inner portion of the central bore 192 is enlarged at 196, to form a recess receiving the spring 197, which surrounds the knockout pin 198. The spring engages the shoulder, at the outer end of the recess 196, and a shoulder 199 on the knock-out pin, as shown in Fig. 17. The knock-out pin 198 extends from the interior of the assembly head, through a passage 200, into the enlarged recess 201 in the side wall of the assembly head, and the knock-out pin 198 and spring 197 are housed, partly, in the recess 196 of the die member 188, and partly, in the recess 201 in the side wall of the assembly head. The functioning of the knock-out pin 198 will be described hereinafter. During the blanking and forming operation, it occupies the position shown in Fig. 17.

Mounted upon the table 104 and extending across the table, beneath a row of die members 188, in the stationary position of the assembly head, is a bar 202, having downwardly projecting ribs 203, at opposite ends thereof, whereby the body of the bar is spaced from the upper surface of the table sufficiently to permit movement of the sheet of metal between the upper surface of the table and the lower surface of the bar. This bar is suitably fastened to the table, as by means of bolts. The bar 202 carries a series of female blanking dies 204, there being one of these for each die member 188 in a row. The mounting of the female blanking dies is best shown in Fig. 17. Each female blanking die 204 is seated in a cylindrical recess 205, in the bar 202, with its shoulder 206 engaging a shoulder in the bar 202, so as to position the die accurately with respect to such bar. The die 204 is held in position by a ring 207, screwed into the cross bar 202 above the die 204. Each die member 204 has a cylindrical central opening 208, therein, to receive the cylindrical projection 191 upon a die member 188 carried by the assembly head, and the lower edge of such cylindrical opening constitutes the cutting edge of the female blanking die 204. The inner surface of the ring 207 may be slightly tapered, as shown in Fig. 17, so as to facilitate the upward movement of the cross bar 202 with respect to the assembly head, and insure the registry of the projections 191 in the cylindrical openings 208 of the female blanking dies.

I have already described the mounting of the table 104, and have pointed out the fact that it is carried by the cross head formed by the plates 98 and 100, with the interposition of springs 112, which permit a movement of said cross head with respect to the table. The cross head formed by the plates 98 and 100, which is shown in Figs. 12 and 20, is caused to reciprocate, as we have already described, by the cam 96 mounted on the shaft 65. This cross head carries the blanking dies, and will be referred to as the blanking cross head. Slidably mounted in the space within the blanking cross head, between the side plates 98 and 100 thereof, is a second cross head 209, which carries the forming punches and will be referred to as the forming cross head. At each end of the forming cross head, there is provided a trunnion 210, which is received in the lower end of an arm 211 (Fig. 8), the upper end of said arm being provided with an eccentric strap 212, surrounding an eccentric 213 upon the shaft 65. Thus, the forming cross head is continually reciprocated within the blanking cross head, as the shaft 65 rotates. Upon each end of the forming cross head, there are fastened two brackets 214, each having at its upper end a laterally extending finger 215. Said fingers engage the upper ends of springs 216 (Fig. 9), the lower ends of which are seated on the base 50 surrounding the studs 217. These springs relieve the cam mechanism of part of the weight of the forming cross head, and the parts carried thereby. At each end of the forming cross head 209, there are fastened, to the side surfaces thereof, guide blocks 218, which engage the ends of the blanking cross head, and serve to guide the forming cross head, in its movement, with respect to the blanking cross head. Likewise, guide blocks 219 (Fig. 4) are fastened to the frame members 51 and engage the side surfaces of the blanking cross head, so as to guide it, in its movement, with respect to the frame. The side members 51 of the frame are, of course, provided with openings 220, in which the cross heads are movable.

In the cylindrical bores 102, formed in the head 99 of the blanking cross head, there are fixed bushings 221, which are internally threaded. Into each of these bushings, there is screwed the lower end of a sleeve 222. Alined passages 223 are provided in the table 104, and bushings 224 are mounted in said passages. The upper ends of the sleeves 222 project into the lower ends of the bushings 224. The male blanking dies 225 are mounted within the bushings 224, with their lower ends contacting with the upper ends of the sleeves 222, and each blanking die 225 is connected, to its sleeve 222, by a split ring 226 which is confined, by the bushing 224, in grooves 227 formed in the blanking die 225 and the sleeve 222, respectively, as shown in Figs. 17 and 18. Holes 228 are provided, in the sleeves 222, for the insertion of a tool, by which the sleeves 222 may be screwed into, or out of, the bushings 221, so as to adjust them vertically. The lower end of each sleeve 222 is provided with a plurality of longitudinally extending serrations 229 to be engaged by a spring-pressed locking pin 230, so as to lock the sleeve 222 against inadvertent movement. Thus, it will be seen that the male blanking dies 225 are carried by the blanking cross head 99, and are movable with respect to the table 104. The reason for this will appear from the description of the operation.

Within each sleeve 222 and blanking die 225, there is slidably mounted a forming punch 231. The lower end of each of these punches has an annular groove 232 therein (Fig. 15), forming a head 233 received in a recess 234 of an angle bracket 235, which is bolted to the forming cross head, as shown in Figs. 10 and 13. The overhang of lip 236, on this bracket, engages in the groove 232 of the forming punches, so that the punch is held against movement with respect to the forming cross head, but may be readily removed for the purposes of repair or renewal. The opening 101, in the side of the blanking cross head, affords room for the movement of the angle brackets 225 on the forming cross head, and permits access thereto when required for the removal of the forming punches.

As shown in Fig. 8, between blanking and forming operations, that is, while the assembly head is moving from one station to the next, the table 104 and the bar 202 are lowered by the blanking cross head, so that the projections 191, on the female die members 188, are clear of the cross bar 202, thus permitting the movement of the assembly head from one station to the next. The forming punches 231 are, also, lowered into retracted position by the forming cross head, as shown in Fig. 8, so that the tops of said punches 231 are below the surface of the table 104, thus permitting the feeding movement of the sheet of metal over said table. Assuming, now, that the assembly head has moved from one position to the next, and has become stationary, and that the sheet of metal has been fed forward into position to be operated upon, the blanking cross head 99 now rises, carrying with it the blanking dies 225 and bar 202. This upward movement continues until the cylindrical projections 191, on the female die members 188, are engaged in the cylindrical openings 208 of the female blanking dies 204, and the upper surfaces of the rings 207 engage the lower surfaces of the female die members 188, as shown in Fig. 17. Further upward movement of the blanking cross head 99 compresses the springs 112, which are interposed between this cross head, or parts carried thereby, and the table, and permits a further movement of the male blanking dies 225, with respect to the table 104 and the bar 202, causing the upper cutting edges, of the male blanking dies 225, to enter the cylindrical recesses 208 of the female blanking dies. In so doing, these blanking dies cut a disk of metal of the required size from the sheet, which disk is retained within the cylindrical recess 208 of the female blanking die. While the blanking dies occupy the position, as shown in Fig. 17, the eccentrics 213 cause the forming cross head 209 to rise, thus moving the forming punches 231, with respect to the sleeves 222 and the blanking dies 225, and projecting the upper ends of said forming punches against the disks, which the blanking dies have cut from the sheet of metal and which are held in the cylindrical recesses 208 thereof. The upward movement of the forming punches 231 forces the central portions of such disks toward the lower ends of the knock-out pins 198, drawing the metal of the disks against the female forming dies and draw-forming the metal disks into the required shape of the caps to be made. The continued rotation of shaft 65, now, causes the forming cross bar to descend, carrying with it the forming punches 231, after which the blanking dies 225 and, subsequently, the table 104 and the bar 202, descend. When these parts have descended and occupy the position shown in Fig. 8, the mechanism is ready for a movement of the assembly head to a new station, to present the next series of female dies, and a feeding movement of the sheet of metal, to present a fresh portion thereof for the operation of the blanking and forming devices. The caps which have been formed by the blanking and forming devices, are held frictionally in the female die members 188, with the inner surface of the cap outermost. The forming punches press and draw the metal so firmly into the fluted grooves 194, of the female dies, that the friction is sufficient to retain the formed caps in these dies, until they are displaced therefrom by the action of the knock-out pins 198, which will be described hereinafter.

As the assembly head rotates, step by step, the formed caps held, with their inner surfaces outermost, in the female die members 188, are carried to a station, at which a cork disk is positioned within each of these caps. The mechanism for feeding these cork disks, and inserting them in the formed caps, will now be described.

Upon the transverse bars 55, carried by the standards 54 at the top of the machine, there are mounted, side by side, a series of castings 237, of the form shown in the perspective view, Fig. 42. As shown in Fig. 39, the castings mounted upon the lower bar are reversed with respect to the castings mounted upon the upper bar. Each of the castings 237 has an inclined guide surface 238, upon which an agitator basket can slide, being confined in its sliding movement by the side walls 239. An opening 240 is provided in the bottom of each casting 237, through which the connections for moving the agitator basket may pass. Each casting is provided with a pair of shoulders 241, seating on the cross bar 55, and having bolt holes 242 therein, through which the bolts pass for securing the casting to the cross bar. An under-cut notch 243 is provided in the upper edge of each side wall 239, for engagement by certain guide members. From one end of the base of each casting 237, there projects a tongue 244, provided with a funnel-shaped opening 245 therein, to which the upper end of a feed pipe 246 is connected. As shown in Fig. 39, the castings 237 are mounted on the bars 55, so that the tongues 244, and the feed openings 245 therein, are arranged adjacent to each other along the central transverse line of the machine. The hopper 247 is mounted, at its lower side edges, upon the portions 248 of the castings 237, as shown in Fig. 41, the lower side portions of the hopper being provided with openings, through which parts of the agitating baskets can slide. A cross bar 249 extends longitudinally thereof, as shown in Figs. 40 and 41. This cross bar supports guide members 250, of the form shown in the perspective view, Fig. 44. These guide members have downwardly extending legs 251, the lower ends of which engage in the under-cut notches 243 of the castings 237. These guides 250 cooperate with the castings 237, to guide the agitator baskets in their reciprocating movements. They also serve to cover the spaces between adjacent baskets, so that disks cannot lodge between them.

Since the castings 237 are mounted upon the bars 55, with adjacent castings, considering the tongues 244, in reversed position, it follows that the guide surfaces 238 of adjacent castings 237 will slope in opposite directions from the feed openings 245. Upon each of the surfaces 238, there is mounted a slidable agitating basket 252. Each basket comprises a bottom wall 253, end and side walls 254, and a top wall 255. The walls of this basket may have perforations formed therein, to lighten them, but these perforations are of a diameter less than that of the cork disks to be fed by the baskets from the hopper into the feed tubes 246, so that the cork disks will not pass from the hopper through the lightening perforations, but must pass through the open end of the basket. The bottom of each basket is formed by a plate 256, having a funnel-shaped feed opening 257 therein, which, at points in the stroke of the agitating basket, is adapted to aline with the funnel-shaped feed opening 245 in the corresponding block 237. As already stated, the rear portion of the bottom wall 253, of each basket, slides in a slot formed in the side wall of the hopper. A bracket 259 is fastened to the bottom wall of each agitating basket. The brackets 259 of the baskets mounted on the lower bar 55, of Fig. 39, are each connected, by a pin 260 to an eccentric arm 261 having a strap 262, surrounding an eccentric 263 on the shaft 264. The shaft 264 is journaled in brackets 265, fastened to the frame members 54, and driven by belt 266 extending from the motor 57 to a pulley 267 on shaft 264. Brackets 268 are secured to the frame members 54, at the opposite side of the machine from the shaft 264. Plates 269 are fastened to the brackets 268, being spaced therefrom by the spacing blocks 270. The upper surfaces of the brackets 268 form, with the plates 269, guides for the shuttle bar 271, which is reciprocated laterally by means of the following connections with the shaft 264. Brackets 272 (Figs. 39 and 43), fastened to the shuttle bar 271, are connected by pins 273 to the links 274, the other ends of which are provided with eccentric straps 275, surrounding eccentrics 276 on the shaft 264. The brackets 259, upon the agitating baskets 252, which are mounted upon the upper cross bar 55, as shown in Fig. 39, are connected by links 277 to brackets 278, secured to the shuttle bar 271, as shown in Fig. 43. Thus, as the shaft 264 rotates, all the baskets 252 are caused to reciprocate upon their guides. A supply of cork disks having been dumped into the hopper 247, the shuttle motion of these agitating baskets causes the cork disks to feed into the interior of the baskets and through the feed openings 257 into the feed openings 245 of the blocks 237, and, thence, into the several feed pipes 246, in which the cork disks stack one upon the other, and through which they feed by gravity to the transfer mechanism, by which they are individually transferred, as needed, to the devices which insert them in the formed caps.

Bolted to the cross bar 52, and depending therefrom, is a feed frame 279, comprising an upper bar 280, a lower bar 281, and a series of vertically extending ribs 282, connecting the upper and lower bars. To have convenient access to the feed pipes 246, in case of an accidental stoppage therein due to a jamming of the cork disks, or the like, it is desirable to make these pipes in two sections. The lower sections 283 have their lower ends mounted in the lower frame member 281, in line with discharge openings 284 therein. The upper ends of the feed pipe sections 283 extend through openings provided in the upper bar 280 of the feed frame, and project through openings formed in the bar 52, which are somewhat greater in diameter than the pipes 283. The upper ends of the pipe sections 283 abut the lower ends of the pipes 246 so that the sections 283 constitute a continuation of the pipes 246. For each feed pipe, a knurled sleeve 285 is provided, which is slidably mounted on the lower end of the feed pipe section 246, and has a reduced lower portion 286 fitting in the opening of the cross bar 52 surrounding the upper end of the feed pipe sections 283. Thus, by lifting the knurled sleeve 285 until the portion 286 thereof clears the cross bar 52, the upper feed pipe section 246 may be swung to one side and removed from the machine, so as to clear up readily any stoppage which may have occurred.

About midway between the upper bar 280 and the lower bar 281 of the feed frame, the ribs 282 are provided with shoulders 287, the ribs being reduced in thickness below said shoulders to form guide surfaces for the disk-positioning bar. A plate 288 is bolted to the ribs 282 by the bolts 289. This plate co-operates with the portions of the ribs 282 below the shoulders 287, to form a series of channels in which the disk-positioning bar 290 is slidable. (See Figs. 3, 10 and 21.)

In the lower bar 281, of the disk feed frame, there is provided a series of openings, twelve, in this case, located vertically below the disk-positioning bar. In each of these openings, there is provided a bushing 291, in which the stem 292 of a disk guide is slidably mounted. The lower end of the disk guide is enlarged at 293 and, within this enlarged portion, there is provided a disk-receiving chamber 294, having a constriction 295 adjacent the mouth thereof, the diameter of this constriction being slightly less than the diameter of the cork disks to be positioned in the metal caps, so that the disk has to be compressed slightly to force it past said constriction and into the metal cap. The lower portion of each disk guide is provided with a beveled nose 296, which is adapted to center the guide with reference to the formed metal cap, as shown in Fig. 24. Each disk guide has a longitudinal bore 297 extending upwardly therein from the disk-receiving chamber 294. A positioning plunger 298 is slidably mounted in the bore 297 and provided with a head 299 which is adapted to work in the disk-receiving chamber 294. The diameter of head 299 is slightly less than the diameter of the constriction 295, so that it can pass this constriction and be projected to the position shown in Fig. 24. The upper end of each disk-positioning plunger 298 is connected, as shown in Fig. 25, to the positioning bar 290 and coiled springs 300 surround the stems of the plungers 298 and are interposed between the lower surface of the positioning bar 290 and the upper ends of the disk guides 292.

The positioning bar 290 is caused to reciprocate in its guides by the following mechanism. A box cam 301, fast on shaft 77 (Fig. 8), is provided with a cam groove which receives a roller 302, carried by the end of an arm 303 (Fig. 25), fixed on a stub shaft 304, which is suitably journaled in the frame. At the opposite end of the stub shaft 304, there is fixed an arm 305, the free end of which is connected by a link 306 to one end of the positioning bar 290. A similar cam, rock shaft and connections are provided at the opposite end of the disk-positioning bar. It will be apparent, therefore, that, as the shafts 77 rotate, in the operation of the machine, the positioning bar 290 will be caused to reciprocate in its guides, thus projecting and retracting, at proper periods, the disk-positioning plungers 298 and the disk guides 292.

An angle plate 307 is fastened to the lower bar 281 of the feed frame (Fig. 10), so as to provide a space between the lower web of the plate 307 and the lower surface of the bar 281, within which a disk-feed bar may be reciprocated. The disk feed bar 308 (Figs. 22 and 23) has rearwardly extending arms 313 projecting through openings provided in the vertical web of the angle plate 307. As stated, this feed bar 308 reciprocates laterally, in the space provided between the lower surface of the bar 281 and the upper surface of the horizontal web of the angle plate 307. The forward edge of the feed bar 308 is provided with a plurality of spaced rectangular notches 309, the said notches being spaced longitudinally of the bar in correspondence with the spacing of the several feed tubes. Each disk guide 293 has opposite parallel faces engaged by opposite sides of a notch 309, to guide the feed bar 308, in its feeding movement. A slot 310 is formed through the side wall of the chamber 294 of each disk guide 293, so that the feed bar 308, in its lateral reciprocation, may force a disk laterally ahead of it through the slot 310, into the disk-receiving chamber 294 of the disk guide, below the head 299 of the disk-positioning plunger.

The stub shafts 304 are journaled in bearings 311 carried by the side members 51, as shown in Fig. 21. A shaft 312 is also journaled in bearings 311, but on an axis parallel to that of the shafts 304. The rearwardly extending arms 313, on the feed bar 308, are connected by links 314 to arms 315, fixed on the shaft 312 (Fig. 22). The arms 316, fixed on said shaft 312, are connected to the free ends of the links 317 (Fig. 10), the opposite ends of said links being provided with eccentric straps 318, surrounding the eccentrics 79, which we have previously described as a part of the Geneva movements for imparting the step-by-step movement to the assembly head and transfer drum. Thus, as the shafts 77 rotate, the feed bar 308 is reciprocated laterally. The retracted position of the feed bar is such that the notches 309 therein will, then, line up with the lower ends of the feed pipes 283, so as to permit one disk to drop from each of these feed pipes onto the plate 307, resting in the notches 309. The feed bar 308 is then moved laterally, forcing the disks through the notches 310 in the respective disk guides 293, and disposing them in the disk-receiving chambers 294 above the constrictions 295 therein, but below the plunger heads 299. When this has been effected, the feed bar 308 is retracted once more to pick up another set of disks from the feed pipes 283.

As already described, a supply of the cork disks, to be positioned in the caps, is put in the hopper 247. The continual reciprocation of the agitating baskets 252 therein causes these disks to feed into the feed pipes 246, to become stacked therein and feed down therethrough into the feed pipe sections 283. As just described, the reciprocating feed bar 308, at each stroke, takes one disk from the bottom of the stack in each feed pipe and moves these disks laterally, disposing each disk in the disk-receiving chamber 294 of the corresponding disk guide, below the plunger head 299. When the feed bar 308 withdraws, after having thus disposed the disks in the disk-receiving chambers, the positioning bar 290 is moved downwardly. Due to the springs 300, the downward movement of the positioning bar 290, first, moves the disk guides 293 downwardly until the beveled noses 296 thereof engage the formed caps, carried by the row of female die members located below the disk guides. When the disk guides engage the edges of the formed caps, as shown in Fig. 24, further downward movement of the disk guides ceases, and the continued downward movement of the positioning bar 290, compressing the springs 300, forces the disk-positioning plungers 298 downwardly with respect to the disk guides. Since the heads 299 of the plungers are above the cork disks disposed in the disk-receiving chambers 294, the downward movement of these plungers forces the cork disks ahead of them, past the constrictions 295, into the open interiors of the formed caps, in which the cork disks are disposed by the plungers, as shown in Fig. 24. Friction and gravity, together, hold these cork disks in place in the formed caps, until they are more permanently secured therein, in the further operation of the machine. Having, thus, disposed cork disks in the formed caps, the plungers 298 are retracted, leaving the disks in the caps, and the disk guides 293 are then retracted to normal position, freeing the assembly head, so that it may rotate step-by-step to other operating stations and other formed caps may be brought into position beneath the disk guides to receive their cork disks.

As is shown in Fig. 10, the disk-positioning mechanism is arranged above the assembly head, diametrically opposite the blanking and forming devices, so that in the particular machine illustrated, six steps of movement are necessary to carry a row of formed caps from the blanking and forming station to the disk-positioning station. In the particular machine illustrated, the transfer drum, and the point of transfer from the assembly head to the transfer drum, are so located that two steps of movement are necessary to carry a row of caps from the disk-positioning station to the transfer station. The mechanism by which the assembled caps are transferred from the assembly head to the transfer drum, upon which they are retained and carried through subsequent operations, will now be described.

Before describing the transfer mechanism, it will be helpful to explain, more fully, the construction of the transfer drum and the devices by which the caps are retained upon the transfer drum, after they have been transferred thereto. As already explained, the transfer drum comprises a side wall 84, having radially-projecting, spaced ribs 85, and the end walls 86, which are bolted to the inwardly-extending flanges 320 on the side wall 84 of the drum. As shown in Figs. 3 and 10, the transfer drum is made in two sections, a portion of one section being shown, in perspective, in Fig. 37. These two semi-cylindrical sections are held together to form the complete drum by the end plates 86, which are bolted thereto. In the sides of the ribs 85, there are formed curved notches 321. Openings 322 are formed through the side wall 84 of the transfer drum, with their axes coincident with the axes of the curved surfaces of notches 321. Mounted between the ribs 85, are a plurality of cap-retaining devices, one of which is shown in perspective in Fig. 38. Each of these cap-retaining devices comprises a body portion 323, having slots 324 formed in the opposite sides thereof. The body portion 323 includes, also, a hollow, open-ended shell 325, the lower portion of which is received in the opposed notches 321. Slidably mounted within the shell 325, and passing through an opening 326 in the bottom thereof, is a hollow stem 327. A cap-receiving head 328 is fixed upon the outer end of this stem 327, said head being of such shape as to receive a cap thereon, in the position shown in Fig. 34. A transverse slot 329 may be formed in the head 328, for a purpose hereinafter to be stated. The inner end of the stem 327 is provided with an enlarged shoulder 330, adapted to engage the base of the shell 325 and limit outward movement of the stem with respect to said shell. A spring 331, surrounds the stem 327, is housed within the shell 325, and compressed between the head 328 and the base of the shell 325. A pair of retaining dogs 332 are pivoted, at 333, on the body 323 of the cap-retaining device. The outer ends of said dogs are provided with projecting teeth 334, which are adapted to engage the edge of a cap, to hold it in position upon the head 328, as shown in Fig. 34a. The teeth 334 are so formed that they will hold the caps without marring any decoration thereon, and engage the edge of the cap, only, as shown. The tails of the dogs 332 are provided with projecting fingers 335. A plunger 336 is slidably mounted in the hollow stem 327, a spring 337 being compressed between the outer end of the plunger 336 and the bottom of the recess 338, formed in the hollow stem 327. The plunger 336 has an enlarged inner end 339 which is slidably mounted in one of the openings 322 of the side wall 84 of the transfer drum, and projects into the interior of said drum. An annular shoulder 340 is formed on the plunger 336, having a beveled side 341. This annular shoulder 340 is located between the exterior surface of the side wall 84 of the drum, and the shoulder 330 of the hollow stem 327. In Fig. 29, the cap-retaining devices in the upper row shown, are in the inactive position, ready to receive caps, and the teeth 334 engage the sides of the heads 328 while the fingers 335 engage the enlarged portions 339 of the plungers 336, below the annular shoulders 340. The lower row of cap-retaining devices shown in Fig. 29, and also the cap-retaining device shown in Fig. 34a, are in active position for holding the caps thereon, and ready to be actuated to discharge such caps. It will be noted, that, in the active position, the teeth 334 engage the edge of the flaring flange on the cap, to hold it upon the head 328, while the fingers 335 engage the annular shoulder 340 on the plunger 336, which separates the tails 335 of the dogs 332, thus holding the teeth 334 in the active, or retaining, position.

The inner edge portions of the body 323, of each cap-retaining device, seat upon the shoulders 342 of the ribs 85, and the cap-retaining devices are held thereon by the longitudinal strips 343, which are bolted to the ribs 85 by the bolts 344, as shown in Fig. 36. The edges of the strips 343 engage the ledges 345, formed upon the body portion 323 of each cap-retaining device.

Referring, now, to Fig. 10, and Figs. 29 to 33, which disclose the construction of the transfer mechanism carried by the assembly head, the end portion of one of the two bushings 72, supported in frame 51 and surrounding shaft 65, is shown in Fig. 32. Each of the bushings 72 has a portion of reduced diameter in front of the shoulder 346. Upon this reduced portion, there is mounted a guide cage, shown also in the perspective, Fig. 32. This guide cage comprises two sections 347, having notches 348 to receive the bushing 72, to which this guide cage is keyed. The two sections 347 are clamped about the bushing, by bolts 349 passing through the bolt holes 350. The sections of the guide cage are provided with guide flanges 351, which extend parallel to each other, as shown in Fig. 32. These two guide cages serve to guide, for movement transversely of the axis of the assembly head, a transfer frame, which is slidably mounted therein. This frame comprises the side bars 352, connected at their ends by the cross bars 353. Each cross bar 353 has an elongated opening 354 therein, through which the shaft 65 extends. It will be seen, therefore, that this transfer frame is mounted about the shaft 65 and supported in the guide cages 347, in such a way that it may move transversely with respect to the axis of the assembly head.

Upon the shaft 65, within the assembly head and the transfer frame, there are keyed three eccentrics 355, roller bearings 357 being interposed between the outer surfaces of the eccentrics and the inner surfaces of the rings 356. The outer surfaces of the rings 356 engage the inner faces of the side bars 352 of the transfer frame. It will be evident, therefore, that, as the shaft 65 revolves, due to the eccentrics 355 keyed on said shaft, the transfer frame will be reciprocated transversely of the assembly head once for each revolution of the shaft 65. One of the side bars 352, of the transfer frame, carries a series of studs 358, these studs being positioned longitudinally, to correspond with the space of the knock-out pins 198 carried by the assembly head. The eccentrics are so arranged and timed with respect to the other mechanism that, while the assembly head is stationary, the transfer frame will reciprocate laterally, so as to cause the studs 358 to press against the inwardly projecting ends of the knock-out pins 198, positioned in registry therewith. Thus, these knock-out pins are forced outwardly.

Referring to Figs. 34 and 34a, this movement of the transfer frame presses the knock-out pins 198 outwardly, compressing springs 197 and forcing the assembled caps from their seats in the female die members. The assembly head and the transfer drum, and their drive, are so coordinated that, when this takes place, a set of cap-retaining devices on the transfer drum will stand opposite to the female die members on the assembly head, so that, when the knock-out pins 198 are projected, to unseat the caps from the die members, the caps will be moved by the knock-out pins 198 into position upon the heads 328 of the cap-retaining devices carried by the transfer drum.

The operation of the devices, by which the caps are transferred from the assembly head to the transfer drum and retained upon the latter until the discharge station is reached, is shown in Figs. 34 and 34a. As shown in Fig. 29, when the empty cap-retaining devices approach the transfer station, the teeth 334 engage the sides of the plunger heads 328 and the fingers 335 engage the beveled surfaces 341. The pressure exerted by the knock-out pins 198, when they are projected, unseats the caps from the female die members and positions them on the heads 328, forcing these heads and the plungers 327 inwardly. As shown in Figs. 29 and 38, the shoulders 330 are spaced from the shoulders 340 on plungers 336, when the cap-retaining devices are empty. Consequently, the first effect of the pressure exerted by the knock-out pins is to position the caps on the heads 328 and force the plungers 327 inwardly, compressing the springs 338. When the annular shoulders 330 on the plungers 327 engage the annular shoulders 340 on the plungers 336, the latter are forced inwardly to the position shown in Fig. 34. This inward movement of plungers 336 causes the beveled surfaces 341 to ride over the fingers 335, thus spreading the tail ends of the dogs, and bringing the teeth 334 to the position shown in Fig. 34. As soon as the knock-out pins are retracted, the compressed springs 338 project the plunger heads 328, but the fingers 334 engage the edges of the caps, as shown in Fig. 34a, because the fingers 335 are held apart by the annular shoulders 340 on plungers 336. Thus, the caps are retained upon the transfer drum until the discharge station is reached. As shown in Fig. 34a, it will be evident that that the teeth 334 are so shaped as to engage the edge portions of a cap. Accordingly, the decoration thereon is not marred by these gripping devices.

The sheet of metal from which the caps are formed is preliminarily coated, on one side, with an adhesive lacquer which softens under the influence of heat and sets upon cooling. The lacquer is used to cement the cork disks in place within the caps. Therefore, after the caps, with the cork disks positioned therein, have been transferred to the transfer drum, they are carried by the drum, in its step-by-step movement, to a heating station, at which the flames from gas burners heat the caps. After leaving the heating station, the caps are retained in position on the transfer drum through several succeeding steps or movements of the drum, so that the lacquer, which has been softened by the application of heat, is allowed to cool and set to cement the cork disks in place.

The burners for heating the caps, and the control of such burners by which they are thrown out of operative relation with the transfer drum when the machine is idle, are illustrated in Figs. 1, 3, 45 and 46. A pipe 359, connected with a suitable gas supply, is journaled in the frame members 54. A series of burners 360 are connected with the pipe 359 and arranged (see Fig. 3) so that, normally, the flames issuing therefrom heat the caps retained on one row of cap-retaining devices of the transfer drum, as they stand at the heating station of the drum. It would be objectionable, however, to have the burners fixed in this relation, because, if the machine were stopped, the caps located beneath the burners would probably be ruined by the prolonged heating thereof. Therefore, I provide connections whereby the burners are automatically thrown out of heating relation to the transfer drum when the clutch is operated to stop the machine. An arm 361, clamped to one end of the pipe 359, is connected by an adjustable link 362 and pin 363 to the upper end of a link 364. The lower end of link 364 is pivotally connected, at 365, to the clutch-operating lever 62. The clutch-operating lever is pivoted at 367 to a bracket 366, extending from one of the side members of the frame. As shown in Figs. 1, 45 and 46, the lever is in position so that the clutch connects the machine to the motor and the machine is operated. When the clutch lever 62 is moved to the right (Fig. 46), to stop the machine, it pulls downwardly on the link 364, thus rocking the pipe 359 in a counter-clockwise direction (Fig. 1), and this swings the burners 360 upwardly, away from the transfer drum, so that they no longer heat the caps thereon. An arm 368 is fastened to one of the side members of the frame with a slot engageable by the clutch lever 62 to hold that lever in position and keep it from raising or lowering.

After the caps held upon the transfer drum have been heated at the heating station, the step-by-step rotation of the drum carries the heated caps through several intermediate steps to the discharge station. The time interval between the heating of the caps and their discharge is such as to permit them to cool, so that the lacquer will set to cement the cork disks firmly in place. At the discharge station, the caps are released from the cap-retaining devices and discharged from the drum by the following mechanism: The fixed shaft 66, which runs centrally through the transfer drum, has a series of arms 370 keyed thereon, there being one of these arms arranged in alinement with each of the cap-retaining devices in a row. A roller 371 is journaled in the outer end of each arm. As the transfer drum revolves about the fixed shaft 66, the inwardly projecting ends 339 of plungers 336, as they move to the discharge station, contact with the rollers 371, with the result that the plungers 336 are forced outwardly. This removes the annular shoulders 340 from between the fingers 335 of the pivoted dogs 332, so that the teeth 334 of the dogs are now permitted to separate to release the caps, under the outward pressure exerted on the heads 328 by the compressed springs 331. Consequently, the teeth 334 separate and the heads 328 move outwardly to their inactive position. This releases the caps on the row of retaining devices at the discharge station, and they may drop freely from the heads 328 into a receptacle provided to receive them. In order to make sure that the caps are discharged from the heads, a comb is provided, the fingers 372 of which are so located that, as the transfer drum moves from the discharge station, said fingers will enter and pass through the slots 329 formed in the heads 328 of the corresponding row of cap-retaining devices, thus stripping the caps from the heads 328, if they have not freely left them. In order to make sure that the slots 329 will always line up with the fingers 372, two pins 373 are fixed in each head 328, the opposite ends of said pins being received in holes 374 formed in the frame member 323 of the cap-retaining device. Thus, as the transfer drum revolves, the caps carried by the row of cap-retaining devices at the discharge station will be released and discharged from the machine.

Referring to the sheet-feeding mechanism, I have also found it desirable to provide automatic stop devices to prevent over-feeding of the sheet, due to its momentum, as it is moved to the blanking and forming devices. To this end, I have provided a series of transverse slots 375, in the machine illustrated, four in number, on the under surface of the bar 202, as illustrated in Fig. 47. In each of these slots, there is located a spring strip 376, said strips being secured at one end to the bar 202 by the screws 377. To the opposite end of each spring strip 376, there is fastened a stop block 378. These blocks are of the same width as the spring strips 376, with the end thereof curved on a radius corresponding to that of the holes formed in the sheet of metal by the blanking operation. Forming the stop blocks thus avoids the necessity of cutting into any part of the dies to make room for them. The normal positions of the spring strips 376 are such as to hold the stop blocks 378 down against the metal sheet.
Each strip 376 passes through a slot 379 in a plug 380, slidably mounted in a hole in the bar 202. Vertical strips 381 are fastened to the edge of the projecting bar 202, as shown in Fig. 47, somewhat beyond the upper surface thereof. Upon the upper surface of the bar 202, there are provided four corresponding spring strips 382, which extend through slots 384 in the plugs 380 and carry, at their outer ends, blocks 385 having notches 386 therein, which notches receive the strips 381.
The blocks 385 are never lifted high enough to prevent strips 381 from extending into the notches 386, and hence, the slots 384, the strips 381, spring strips 376 and plugs 380 all serve to retain the spring strips 382 in proper positions. As shown in Fig. 47, these spring strips and stop blocks are arranged upon that portion of the bar 202 which is beyond the blanking and forming dies, considered with reference to the direction of feed of the metal sheets, and the stop blocks 378 are intended to cooperate with the holes left in the metal sheet by the blanking dies.

Projections 387 are provided upon opposite ends of the assembly head, the said projections being positioned relatively to the rows of female die members carried by the head. Upon the ribs 388, carried by the side members 51 of the frame, is mounted a shaft 389 on which the arms 390 are pivoted. The arms 390 are located opposite the projections 387 on the assembly head and each pivoted arm 390 carries a roller 391 adapted to cooperate with said projections 387. An angle bar 392, extending transversely of the machine, is secured to the lower ends of the arm 390. Springs 393 are fastened, at one end, to the arms 390 and, at the other end, to fixed arms 394.

In Fig. 47, the parts are shown in the position which they occupy at the end of a blanking and forming operation, after the table 104 and the bar 202 have descended to the position shown in Fig. 10, but before the assembly head has started its movement from one station to the next. In this position, the lower flange of the angle bar 392 engages beneath the blocks 385 and lifts them away from the bar 202, flexing the spring strips 382. This causes the upward movement of the plugs 380, thus lifting the spring strips 376 until they, and the stop blocks 378, are housed within the slots 375, as shown in Fig. 47. In this position, the sheet of metal can feed freely between the upper surface of the table 104 and the lower surface of the bar 202. As the assembly head rotates, to bring another row of female die members to the blanking and forming station, projections 387 engage the rollers 391 and swing the arms 390 to the right (Fig. 47), thus withdrawing the lower flange of the angle bar 392 from beneath the blocks 385. The blocks 385 being thus released, the spring tension of the strips 382 and 376 causes them to snap downwardly until blocks 378 seat against the upper surface of bar 202, thus moving the plugs 380 downwardly and moving the spring strips 376 away from the lower surface of the sheet of metal. This causes the stop blocks 378 to engage the surface of the sheet of metal on the table 104, so that these stop blocks will enter the openings in the sheet left by the blanking dies at the previous operation of the machine. The stop blocks 378 coact with the edges of such openings to limit the feed of the sheet of metal to the required amount. In this way, over-feeding is prevented.

The plates 381 serve as stops, limiting the swinging movement of the arms 390 under the influence of springs 393. As soon as the projections 387 have passed the rollers 391, the springs 393 cause the arms 390 to move to the left (Fig. 47), but the lower flange of the angle bar 392 now engages the ends of the blocks 385. When the assembly head has completed its rotation to the next station, the table 104 and the bar 202 rise, in connection with the action of the blanking and forming devices, and the blocks 385 are carried upwardly, until the lower flange of the angle bar 392 snaps under the blocks 385. As soon as the blanking and forming devices have acted, and the table 104 and bar 202 descend to the position shown in Fig. 10, such downward movement causes the angle bar 392 to lift the blocks 385 away from the upper surface of the bar 202, bringing the parts to the position shown in Fig. 47, and withdrawing the stop blocks 378 from the holes in the sheet of metal, so that the sheet can be fed to present a new portion for the action of the blanking and forming devices. In this way, the stop devices are automatically projected, so as to limit the forward feed of the sheet, and withdrawn at the proper instant, so as to permit the feed and the re-engagement of such stop devices with another set of holes in the sheet.

The operation of the machine should be apparent from the foregoing description. Briefly, it is as follows: A sheet of metal, from which the metal portions of the caps are to be formed is placed upon the sheet-supporting surface formed by the plates 118, 119 and 120, with the rear edge of the sheet against the stops 140. A supply of cork disks is placed in the hopper 247. The sheet of metal is placed upon the table with its lacquered side down, so that the lacquered surface will be on the interior of the cap, where it will be engaged by the cork disks when they are inserted in the caps. Assuming that the machine is in operation, the rotation of cam 154 causes the link 153 to reciprocate, imparting a step-by-step movement to the ratchet wheel 147, which drives the shaft 136 and the gear wheels 137 with a step-by-step movement. The assembly head and transfer drum also rotate with a step-by-step movement. While the assembly head is moving from one position to the next, the chains 125 advance the sheet of metal one step, positioning it on the table 104, between the upper surface of that table and the lower surface of the bar 202. The stop devices, including the stop blocks 378, act to prevent over-feeding of the sheet. By the time the assembly head has moved one step, to present a row of female die members in line with the male blanking and forming dies, the feeding movement of the sheet will have ceased. The mechanism now operates to cause the table 104 and bar 202 to rise until the portions 191 of the female die members are centered within the openings 208 of the female blanking dies 204, carried by the table 104. Thereupon, the table 104 ceases its upward movement and the male blanking dies 225, rise to punch a row of disks from the metal sheet and carry them against the female die members 194, after which the forming punches 231 rise and engage these disks, acting in conjunction with the female die members to draw the metal into the requisite cap form. The forming punches then descend, after which the male blanking dies descend and the table 104 and bar 202 descend, clearing the female forming die members, so that the assembly head may move to a new station. The downward movement of the bar 202 and the table 104 retracts the stop blocks 378 so that, during the ensuing movement of the assembly head to a new station, the sheet may be fed one step forwardly and laterally to present a new surface for the action of the blanking and forming dies at the next operation. The formed caps are retained in the female forming die members during the next eight steps of movement of the assembly head. Six steps of movement of the assembly head carry the caps retained in the female die members to the disk-inserting station. The agitating feed mechanism has fed cork disks into the feed pipes 283, and the disk-feeding mechanism now operates to feed one disk into each of the disk-receiving chambers 294, below the head of the disk-inserting plungers 297. The plungers now descend and force these disks from the disk-receiving chambers into the metal caps. Two steps of movement from the disk-inserting position carry the assembled caps to the transfer station, in which the knock-out pins are operated to force the caps from the female die members to the head 328 of the cap-retaining devices, at the same time locking the dogs in such position that they will retain the caps upon said heads, when the knock-out pins are withdrawn to their normal position. The empty female die members then proceed toward the blanking and forming station, four steps of movement being necessary to carry them from the transfer station to the blanking and forming station. The transfer drum is also rotated with a step-by-step movement, and the caps held upon the heads 328, by the dogs 332, are carried past the burners 360, which heat them, softening the lacquer on the interior of the caps so as to cement the cork disks thereto. After leaving the heating station, the transfer drums carry these caps, step-by-step, for a sufficient length of time to cool the caps and set the lacquer, to the discharge station, at which the plungers 336 are forced outwardly to release the dogs 332, so that the caps may be discharged from the heads 328. The rotation of the transfer drum, then, carries the empty cap-retaining devices, step-by-step around to the transfer station.

It will be evident, therefore, that I have provided a machine by which bottle caps, for instance, of the crown cap variety, may be automatically made and assembled in large quantities at high speed and with a low labor cost. In the particular machine illustrated, there are, on the assembly head, twelve rows of female die members, and there are twelve of these die members in each row. Therefore, at each stroke of the blanking and forming devices, twelve bottle caps will be formed and, for each complete revolution of the assembly head, one gross of bottle caps will be made. It should be noted that each cap is kept entirely apart from other caps, until discharged from the machine as a finished product. This avoids any marring, scratching or disfigurement of the decorated caps, such as occurs, for instance, when partly finished caps are handled in hoppers, or similar receptacles. It will be seen that I have provided a machine in which the cork disks are inserted in the bottle caps, while the caps are held in the female die members, in which they are formed. Thus, the caps remain in the die members from the time they are formed until they are transferred to the transfer drum, and the cork disks are inserted while the caps are on the assembly head and before being transferred to the transfer drum. It should further be noticed that the caps are blanked and formed at a single station of the machine by the successive action of the blanking and forming dies, in co-operation with the female die members. This is an important feature, inasmuch as no transfer of the blanked disks is effected from one position to another, prior to the forming. It is extremely difficult, if not wholly impossible, to keep such small disks in registry while they are being transferred from blanking devices to forming devices. I have avoided this difficulty by the use of double-acting dies, which first blank, and, then, form the caps in conjunction with the same female die members.

I am aware that the particular machine herein described and illustrated is susceptible of many changes and variations without departing from the spirit of my invention and, therefore, I claim my invention broadly, as indicated by the appended claims.

What I claim is:

1. A machine of the class described comprising the combination of an assembly head, means for moving said head intermittently from station to station, means at one station for blanking a disk from a sheet of metal and forming said disk into a cap on the assembly head, the latter carrying said formed cap from station to station as the head moves intermittently, means at another station for inserting a disk within the formed cap, and means at another station for discharging the cap with the disk positioned therein from the assembly head.

2. A machine of the class described comprising the combination of an assembly head, means for moving said head intermittently from station to station, a transfer drum, means for moving said transfer drum intermittently in step with said assembly head, means at one station for blanking a disk from a sheet of metal and forming said disk into a cap on the assembly head, the latter carrying the formed cap from station to station, means at another station for inserting a disk in said formed cap, means at another station for discharging said cap with the disk inserted therein from the assembly head and transferring it to the transfer drum, releasable means on the transfer drum for retaining said cap thereon, and means for actuating said releasable means to permit discharge of the cap from said drum.

3. A machine of the class described comprising the combination of an assembly head, means for moving said head intermittently from station to station, a transfer drum, means for moving said transfer drum intermittently in step with said assembly head, means at one station for blanking a disk from a sheet of metal and forming said disk into a cap on the assembly head, the latter carrying the formed cap from station to station, means at another station for inserting a disk in said formed cap, means at another station for discharging said cap with the disk inserted therein from the assembly head and transferring it to the transfer drum, releasable means on the transfer drum for retaining said cap thereon, and heating means positioned to heat the cap while held on said transfer drum.

4. A machine of the class described comprising the combination of a rotatable assembly head, means for intermittently rotating said head from station to station, means at one station for blanking a plurality of disks from a sheet of metal and forming said disks into a plurality of caps on the assembly head, the latter carrying said formed caps from station to station, means at another station for simultaneously inserting disks in said formed caps, and means at another station for simultaneously discharging said caps with the disks inserted therein from the assembly head.

5. A machine of the class described comprising the combination of a rotatable assembly head, means for rotating said head intermittently from station to station, a rotatable transfer drum, means for rotating said drum intermittently in step with said assembly head, means at one station for simultaneously blanking a plurality of disks from a sheet of metal and forming said disks into a plurality of caps on the assembly head, the latter carrying said formed caps from station to station as the head rotates, means at another station for simultaneously inserting disks in said formed caps, means at another station for simultaneously discharging said caps with the disks inserted therein from the assembly head and transferring them to the transfer drum, releasable means for retaining said assembled caps upon the transfer drum, and means actuated by the rotation of said drum for operating said releasable means to discharge the caps therefrom.

6. A machine of the class described comprising the combination of a rotatable assembly head, a plurality of female die members carried by said head, means for rotating said head intermittently from station to station, means at one station for blanking a disk from a sheet of metal and forming said disk in cooperation with the female die member at that time presented at such station into a cap therein, means at another station for inserting a disk within a cap in the female die member presented at said station, and means at another station for discharging a cap with the disk inserted therein from the female die member presented at such station.

7. A machine of the class described comprising the combination of a rotatable assembly head, a plurality of female die members carried by said head, means for rotating said head intermittently from station to station, a rotatable transfer drum, means for rotating said drum intermittently in step with said assembly head, a plurality of cap-retaining devices carried by said drum, means at one station for blanking a disk from a sheet of metal and forming said disk in cooperation with the die member presented at such station into a cap therein, means at another station for inserting a disk in a cap in the die member presented at said station, means at another station for discharging a cap with the disk inserted therein from the die member presented at such station and transferring said cap to the corresponding cap retaining device of the transfer drum, and means actuated by the rotation of said drum for releasing said cap-retaining device to discharge the cap therefrom.

8. A machine of the class described comprising the combination of a rotatable assembly head, a plurality of female die members carried by said head, means for rotating said head intermittently from station to station, a rotatable transfer drum, means for rotating said drum intermittently in step with said assembly head, a plurality of cap-retaining devices carried by said drum, means at one station for blanking a disk from a sheet of metal and forming said disk in cooperation with the die member presented at such station into a cap therein, means at another station for inserting a disk in a cap in the die member presented at said station, means at another station for discharging a cap with the disk inserted therein from the die member presented at such station and transferring said cap to the corresponding cap-retaining device of the transfer drum, and heating means operative to heat the cap while held by said cap-retaining device.

9. A machine of the class described comprising the combination of a rotatable assembly head, a plurality of rows of die members carried by said assembly head, means for rotating said head intermittently to advance the same from station to station, means at one station for simultaneously blanking a plurality of disks from a sheet of metal and forming said disks in cooperation with the die members of the row presented at said station into caps therein, means at another station for simultaneously inserting a disk in each of the caps in the die members of the row presented at said station, and means at another station for simultaneously discharging the caps with the disks inserted therein from the die members of the row presented at such station.

10. A machine of the class described comprising the combination of a rotatable assembly head, a plurality of rows of die members carried by said assembly head, means for rotating said assembly head intermittently to advance the rows of die members from station to station, a transfer drum, a plurality of rows of cap-retaining devices carried by said drum, means for rotating said drum intermittently in step with said assembly head to successively present said rows of cap-retaining devices into operative relation with successive rows of die members upon the assembly head, means at one station of the assembly head for blanking a plurality of disks from a sheet of metal and forming said disks in cooperation with the die members of the row presented at said station into caps therein, means at another station for simultaneously inserting a disk in each of the caps in the die members of the row presented at said station, means at another station for simultaneously discharging from the die members of the row presented at said station the caps with the disks inserted therein and transferring said caps to the cap-retaining devices in co-operative relation with said die members, and means actuated by movement of said drum to release said cap-retaining devices and discharge the caps therefrom.

11. A machine of the class described comprising the combination of a rotatable assembly head, a plurality of rows of die members carried by said assembly head, means for rotating said assembly head intermittently to advance the rows of die members from station to station, a transfer drum, a plurality of rows of cap-retaining devices carried by said drum, means for rotating said drum intermittently in step with said assembly head to successively present said rows of cap-retaining devices into operative relation with successive rows of die members upon the assembly head, means at one station of the assembly head for blanking a plurality of disks from a sheet of metal and forming said disks in cooperation with the die members of the row presented at said station into caps therein, means at another station for simultaneously inserting a disk in each of the caps in the die members of the row presented at said station, means at another station for simultaneously discharging from the die members of the row presented at said station the caps with the disks inserted therein and transferring said caps to the cap-retaining devices in co-operative relation with said die members, and heating devices arranged to heat said caps while held by said cap-retaining devices.

12. A machine of the class described comprising the combination of a rotatable assembly head, a plurality of die members carried by said head, means for rotating said head intermittently to advance said die members from station to station, blanking and forming mechanism located at the blanking and forming station and adapted to co-operate with the die members on the head to blank a disk from a sheet of metal and form said disk in a die member presented at said station, disk-inserting mechanism at the disk-inserting station and adapted to co-operate to insert a disk in a cap in the die member presented at said station, and discharge mechanism adapted to discharge the assembled cap from the die member at the discharge station.

13. A machine of the class described comprising the combination of a rotatable assembly head, a plurality of die members carried by said head, means for rotating said head intermittently to advance said die members from station to station, knock-out pins working within said die members, means at one station for blanking a disk from a sheet of metal and forming a cap therefrom in a die member presented at said station, and means for actuating the corresponding knock-out pin at another station to discharge the formed cap from said die member.

14. A machine of the class described comprising the combination of an assembly head, a plurality of forming dies carried thereby, means for moving said head intermittently to advance the dies from station to station, a table at the blanking and forming station, a female blanking die carried by said table but spaced therefrom, means for feeding a sheet of metal on said table beneath the female blanking die, a male blanking die movable in said table, a forming punch, means for moving the table with respect to the head to cause the female blanking die to receive the forming die, means for moving the male blanking die with respect to the female blanking die to blank a disk from the sheet of metal, and means for moving the forming punch against said disk to form a cap therefrom in the forming die.

15. In a machine of the character described, the combination of a table, a male blanking die on said table, a forming punch on said table, a female blanking die support mounted on said table, a female blanking die on said support, a series of forming die members movable intermittently to successively position them in registry with said blanking dies and forming punch, means for feeding a sheet of metal between said blanking dies, means for moving said table and female blanking die support toward a forming die member positioned in registry therewith, said female die member limiting the movement of said support, whereby the male blanking die is moved relatively to the female blanking die to blank a disk from the sheet of metal, and means for moving the forming punch relatively to the table to form a cap from the blanked disk in said forming die member.

16. In a machine of the character described, the combination of a female blanking die, a male blanking die, a forming punch arranged concentrically of said dies, means for feeding a sheet of metal between said blanking dies, a series of forming dies, means for successively positioning said forming dies in alinement with said punch and blanking dies, means for moving one blanking die with respect to the other blanking die to blank a disk from said sheet of metal, means for moving said forming punch toward the alined forming die and against the disk to form a cap from the disk within said forming die, and means for depositing disks in the formed caps while retained in the forming dies.

17. In a machine of the character described, the combination of a female blanking die, a male blanking die, a forming punch arranged concentrically of said dies, means for feeding a sheet of metal between said blanking dies, a series of forming dies, means for successively positioning said forming dies in alinement with said punch and blanking dies, means for moving one blanking die with respect to the other blanking die to blank a disk from said sheet of metal, means for moving said forming punch toward the alined forming die and against the disk to form a cap from the disk within said forming die, means for depositing disks in the formed caps while retained in the forming dies, and knock-out pins working in said forming dies to eject the formed caps therefrom.

18. In a machine of the character described, the combination of a male blanking die, a female blanking die, a forming punch, means for feeding a sheet of metal between said blanking dies, an assembly head, a series of forming dies on said head, means for intermittently rotating said head to successively position the forming dies in alinement with said blanking dies and punch, means for moving the blanking dies in unison toward an alined forming die member, said die member limiting the movement of one of said die members while the other advances to blank a disk from the sheet of metal, and means for moving the forming punch against the blanked disk and toward the alined die member to form a cap from the disk in said die member.

19. In a machine of the character described, the combination of a table, means for feeding a sheet of metal along said table, a female blanking die carried by said table above said sheet of metal, an assembly head, a series of forming die members carried by said head, means for intermittently rotating said head to successively position said die members in alinement with said blanking die, a blanking die support, a male blanking die carried thereon, a forming punch, a forming punch support slidable in the male blanking die support, means for moving said table toward the assembly head to position the female blanking die against an alined forming die and for moving the male blanking die relatively to the female blanking die to blank a disk from the sheet of metal, and means for moving the forming punch against said disk and toward the assembly head to form a cap from said disk in said forming die.

20. In a machine of the class described, the combination of a series of forming dies movable successively from station to station, means at one station for blanking a disk from a sheet of metal and forming said disk in cooperation with the die in registry at said station into a cap therein, means at a second station for inserting disks in caps in said forming dies, and means at a third station for discharging said caps with the disks therein from the forming dies.

21. In a machine of the class described, the combination of a series of forming dies, means for moving said dies to successively position them at a plurality of stations, a transfer member, means at one of said stations for blanking a disk from a sheet of metal and forming said disk in cooperation with the forming die positioned at such station into a cap therein, means at a second station for inserting disks in the caps in said forming dies, means at a third station for transferring said caps with the disks therein from said forming dies to said transfer member, and means for discharging said caps and inserted disks from said transfer member.

22. In a machine of the class described, the combination of a series of forming dies, means for moving said dies to successively position them at a plurality of stations, a transfer member, means at one of said stations for blanking a disk from a sheet of metal and forming said disk in cooperation with the forming die positioned at said station into a cap therein, means at a second station for inserting disks in the caps in said forming dies, means at a third station for transferring said caps with the disks therein from said forming dies to said transfer member, means for releasably retaining the caps and inserted disks on the transfer member, means for heating said caps while retained on said member, and means for discharging said caps from the transfer member.

23. In a machine of the class described, the combination of a supporting surface, forming dies arranged transversely of said surface, means for feeding sheets of metal along said surface toward and past said dies, and means engageable with the side edges of the sheets of metal for moving them laterally during feeding movements thereof.

24. In a machine of the class described, the combination of a series of forming dies, means for feeding sheets of metal with a step-by-step movement to said dies comprising endless traveling articulated members loosely engaging the sheets of metal, and means for moving the sheets of metal laterally with respect to said articulated members during the feeding movement of the sheets.

25. In a machine of the class described, the combination of a series of forming dies, a supporting surface, means for feeding sheets of metal along said surface, members at the sides of said surface engageable with the side edges of sheets of metal on the surface, and means for moving said members, together with the sheets of metal on said surface, laterally of said surface.

26. In a machine of the class described, the combination of an assembly head, means for intermittently rotating said head, a supporting surface, means for feeding sheets of metal along said surface during rotation of said head, and means operable in unison with said head for imparting a lateral movement to sheets of metal on said supporting surface.

27. In a machine of the class described, the combination of an assembly head, means for intermittently rotating said head, a supporting surface, means for feeding sheets of metal along said surface, and a frame engaging the side edges of sheets of metal on said surface, said frame being movable laterally of said surface during rotation of said head.

28. In a machine of the class described, the combination of an assembly head, means for intermittently rotating said head, a supporting surface, means for feeding sheets of metal along said surface, a frame engaging sheets of metal on said surface, and means operable during rotary movement of the head for shifting said frame laterally of the supporting surface.

29. In a machine of the class described, the combination of a rotatable assembly head, forming dies on said head, male and female blanking dies, means for feeding a sheet of metal between the blanking dies, a stop engageable in openings formed in said sheet by the blanking dies for limiting the feeding movement of the sheet, and means for releasably holding said stop out of engagement with said openings, said last mentioned means being operable by said assembly head to release said stop.

30. In a machine of the class described, the combination of an assembly head, forming dies on said head, means for blanking and forming caps in said dies, a transfer drum, cap-retaining devices on said drum, means for transferring caps from the dies to said devices, means for releasably holding said caps on said devices, and means for releasing the caps from said devices.

31. In a device of the class described, the combination of an assembly head, forming dies on said head, means for blanking and forming caps in the dies, a transfer drum, cap-retaining devices on said drum, knock-out pins in said dies for transferring the caps from the dies to the retaining devices, and means for releasably holding the transferred caps on said devices.

32. In a device of the class described, the combination of an assembly head, forming dies on said head, means for blanking and forming caps in the dies, a transfer drum, cap-retaining devices on said drum, knock-out pins in said dies for transferring the caps from the dies to the retaining devices, and gripping elements releasably engaging the caps adjacent their perimeters for holding said caps on said devices.

HORACE J. CARTER.